United States Patent [19]
Takei

[11] Patent Number: 6,108,037
[45] Date of Patent: *Aug. 22, 2000

[54] IMAGE PICKUP APPARATUS IN WHICH THE WHITE BALANCE CONTROLLER CONTAINS A CIRCUIT TO CALCULATE THE COLOR TEMPERATURE FROM THE COLOR SIGNALS

[75] Inventor: Hirofumi Takei, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/582,584

[22] Filed: Jan. 3, 1996

Related U.S. Application Data

[62] Division of application No. 07/940,239, Sep. 3, 1992, Pat. No. 5,530,474.

[30] Foreign Application Priority Data

Sep. 5, 1991 [JP] Japan .................................. 3-225567
Sep. 19, 1991 [JP] Japan .................................. 3-239683

[51] Int. Cl.$^7$ .................................................. H04N 9/73
[52] U.S. Cl. .......................................... 348/224; 348/655
[58] Field of Search ................................ 348/222, 223, 348/224, 225, 227, 228, 229, 255, 256, 528, 655; 358/446, 516; H04N 9/73, 5/52

[56] References Cited

U.S. PATENT DOCUMENTS

| | | |
|---|---|---|
| 4,797,733 | 1/1989 | Takagi et al. . |
| 4,922,330 | 5/1990 | Saito et al. . |
| 4,998,162 | 3/1991 | Kondo et al. . |
| 5,223,921 | 6/1993 | Haruki et al. . |

FOREIGN PATENT DOCUMENTS

| | | |
|---|---|---|
| 0097032A3 | 12/1983 | European Pat. Off. . |
| 0224904A2 | 6/1987 | European Pat. Off. . |
| 0429992A2 | 6/1991 | European Pat. Off. . |
| 0442269A2 | 8/1991 | European Pat. Off. . |
| 2257786 | 10/1990 | Japan . |
| 4252588 | 9/1992 | Japan . |

OTHER PUBLICATIONS

Patent Abstracts of Japan, vol. 17, No. 32 (E–1309) published Jan. 21, 1993, corresponding to Japanese Patent No. 4252588.

English abstract corresponding to Japanese Patent No. 2257786.

*Primary Examiner*—Nathan Flynn
*Attorney, Agent, or Firm*—Morgan & Finnegan

[57] ABSTRACT

In controlling the gain of plural color signals, for the purpose controlling the white balance of a video signal released from an image pickup device and including the abovementioned plural color signals, there is provided a calculation circuit for calculating color temperature information according to the plural color signals and forming a gain control signal according to the color temperature information, and the variable range of the gain control signal is set at one of mutually nonoverlapping plural ranges, whereby the correction error of the white balance is rendered visually inconspicuous. Also in the calculation circuit, the plural color information are weighted according to the result of multiplication of plural coefficients which are variably set according to the mutually different plural hue components of the video signal, and the gain control signal is calculated according to thus weighted plural color information, whereby the white balance is stably controlled despite of the movement of object, variation in image frame or variation in color temperature.

13 Claims, 20 Drawing Sheets

OBJECT 1

WHITE | BLUE

OBJECT 2

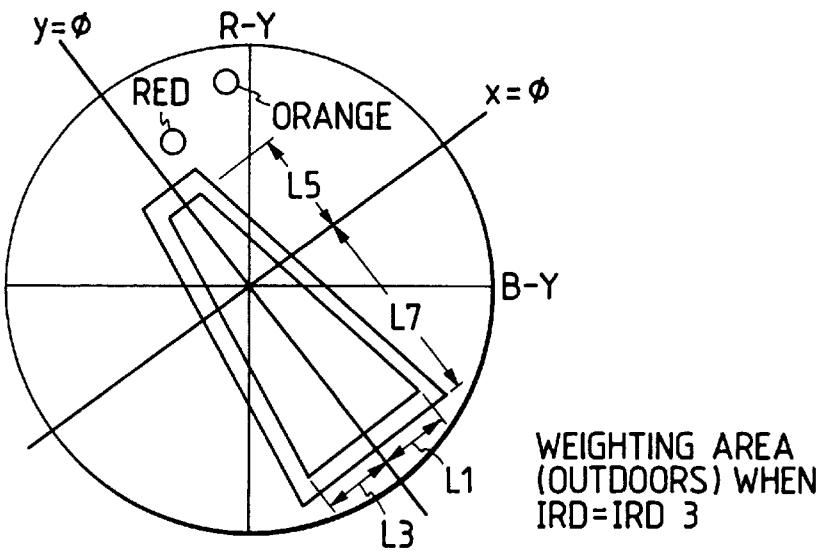
FIG. 30 WEIGHTING AREA (OUTDOORS) WHEN IRD=IRD 3
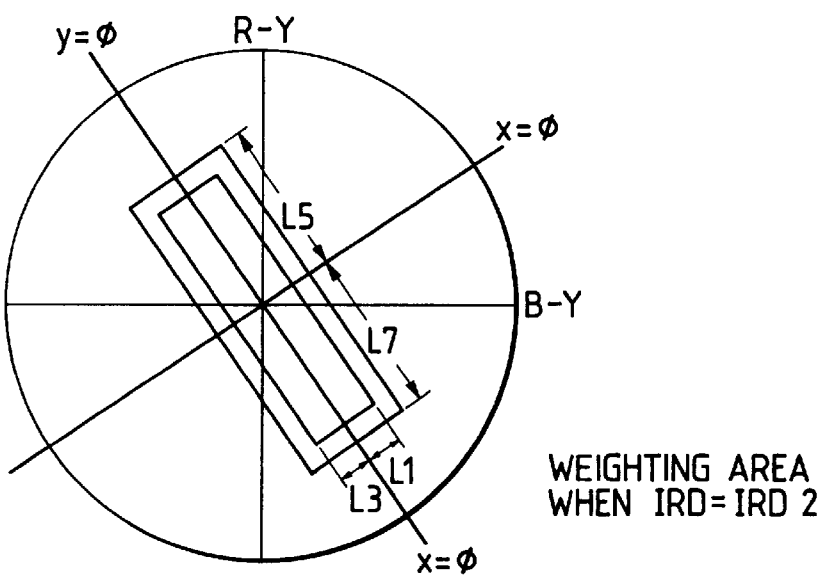
FIG. 31 WEIGHTING AREA WHEN IRD=IRD 2
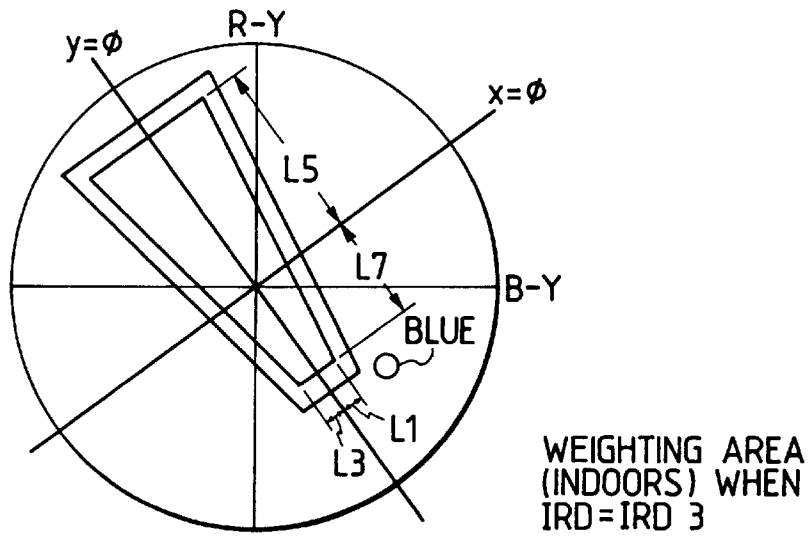
FIG. 32 WEIGHTING AREA (INDOORS) WHEN IRD=IRD 3

IMAGE PICKUP APPARATUS IN WHICH THE WHITE BALANCE CONTROLLER CONTAINS A CIRCUIT TO CALCULATE THE COLOR TEMPERATURE FROM THE COLOR SIGNALS

This is a divisional of application Ser. No. 07/940,239 filed Sep. 3, 1992 now U.S. Pat. No. 5,530,474.

BACKGROUND OF THE INVENTION

1. Field of the Invention

The present invention relates to an image pickup apparatus such as a video camera or an electronic still camera, and more particularly to the white balance control function thereof.

2. Related Background Art

A video camera or the like usually incorporates a white balance correcting device, in order to obtain an appropriate balance of different colors at the image taking operation. FIG. 1 is a block diagram of a prior art video camera including an automatic white balance correcting device, disclosed in a U.S. patent application Ser. No. 070,493 of the present applicant. There are shown an image pickup device 1; a circuit 2 for generating luminance and chromaticity signals; gain control circuits 3, 4 respectively inserted in red (R) and blue (B) signal lines; a color difference signal generating circuit 5; an encoder 6; gate circuits 7, 8; an (R-B) signal detection circuit 9; an averaging circuit 10; a differential amplifier 11; a limiting circuit 12; a tracking correction circuit 13; and a lens 15, wherein the gain control circuits 3, 4 and the circuits 7 to 13 constitute an automatic white balance correction device 14.

The above-explained image pickup apparatus functions in the following manner. Light entering the image pickup device 1 is photoelectrically converted therein, and the obtained signal is supplied to the luminance signal-chromaticity signal generating circuit 2, which generates a high frequency component YH of the luminance signal, a low frequency component YL of the luminance signal, a red signal (R) and a blue (B) signal. Among these signals, the R and B signals are respectively amplified in the gain control circuits 3, 4, according to the characteristics controlled by control signals from the tracking correction circuit 13, to provide color signals R', B' which are supplied, together with a luminance signal YL, to the color difference signal generation circuit 5 for generating color difference signals (R-YL) and (B-YL). Said color difference signals are supplied, together with a luminance signal YH, to the encoder 6 for conversion into a standard television signal. Said color difference signals (R-YL) and (B-YL) are also supplied to the automatic white balance correction device 14. In said device, the color difference signals are respectively supplied to the gate circuits 7, 8 for eliminating an unnecessary signal in the blanking period, an abnormal color difference signal resulting from a signal saturation for a high luminance object etc.

The signals released from said gate circuits 7, 8 are supplied to the (R-B) signal detection circuit 9, which generates an (R-B) signal by calculating the difference of the (R-YL) and (B-YL) signals from the gate circuits 7, 8. The averaging circuit 10 averages the (R-B) signal from the (R-B) signal detection circuit 9, thereby obtaining a DC signal. The differential amplifier 11 compares the output signal level from the averaging circuit 10 with a reference voltage $V_{ref1}$, and generates a signal corresponding to the difference, for supply to the limiting circuit 12, which limits the level of the output signal from the amplifier 11 within a range between $V_{2r}$ and $V_{3r}$, respectively corresponding to the upper and lower limits of color temperature, in order that the white balance is controlled within a practical color temperature range (for example 2000° to 10000° K.). Thus the output from the limiting circuit 12 is limited within the range from $V_{2r}$ and $V_{3r}$.

The output signal of the limiting circuit 12 is supplied to the tracking correction circuit 13, in response, provides the gain control circuits 3, 4 with control signals $R_{cont}$, $B_{cont}$ for controlling the gains of the gain controlling circuits 3, 4 so as to correct the white balance, namely for reducing the (R-B) signal component of the object to zero.

In the following there will be explained an example of the relation between the signals $R_{cont}$, $B_{cont}$ and the color temperature, with reference to FIGS. 2 and 3.

In a vector chart shown in FIG. 3, points X1, X2 and X3 respectively correspond to white color at 6000° K, 2000° K and 10000° K. If the control signals $R_{cont}$, $B_{cont}$ have voltages $V_{1r}$, $V_{1b}$ corresponding to X1 as shown in FIG. 2, said control signal will have voltages $V_{2r}$, $V_{2b}$ for correcting X2 toward the center of the vector chart, and voltages $V_{3r}$, $V_{3b}$ for correcting X3 toward said center.

Since the control signals $R_{cont}$, $B_{cont}$ are limited to $V_{3r}$, $V_{3b}$, an image corresponding to a point X4 in FIG. 3 cannot be corrected to the center X1 of the vector chart even under the function of the white balance correcting device.

Since the automatic white balance correction device 14 has a negative feedback loop explained above, color difference signals with a white balance can be supplied to the encoder 6 within a practical color temperature range.

However the above-explained conventional white balance correction device has been associated with a drawback of generating an error in the white balance correction in cases where the distribution of color temperature of the object is not uniform or in cases where the object contains a large proportion of monochromatic area of a high saturation. In the following there is shown a representative example of such a drawback. In the following description, for the purpose of simplicity, the gain of the gain control circuits 3, 4 shown in FIG. 1 is assumed to be unity.

As an example of the above-mentioned drawback, there will be explained a case of taking white balance on an object 1 shown in FIG. 4, composed of white color by 50% and blue color by 50%.

It is assumed that the object 1 is illuminated with light of a high color temperature, for example of 9000° K. In FIG. 6, $V_{4r}$, $V_{4b}$ indicate the values of the control signals $R_{cont}$, $B_{cont}$ for bringing the white point to the center of the vector chart shown in FIG. 5. When the object 1 is taken with the properly corrected white balance at $R_{cont}=V_{4r}$ and $B_{cont}=V_{4b}$, the white color and the blue color are respectively positioned at $W_0$, $B_0$ in FIG. 5.

If the conventional white balance correction device 14 is activated in this state, the negative feedback loop thereof so functions as to reduce the (R-B) signal component of the object to zero, as explained before. Consequently, on the vector chart shown in FIG. 5, the white and blue points are moved upwards, parallel to the (R-B) axis (namely perpendicularly to a line R-B=0). Thus, when the negative feedback operation becomes stable, and if the limiting circuit 12 is assumed inactive, the white and blue points finally stay at positions $W_1$, $B_1$ satisfying a condition: line segment $B_0B_1$= line segment $B_1A$=line segment $W_0W_1$, wherein the line segment $B_0A$ is parallel to the (R-B) axis, and the point A is on a line R-B=0 which passes through the original point $W_0$ and is perpendicular to the (R-B) axis. The upward movements of the white and blue points in FIG. 5 correspond to increases in the control signals $R_{cont}$ and $B_{cont}$ and the signals $R_{cont}$, $B_{cont}$ required to move the white and blue points to $W_1$, $B_1$ are $V_{7r}$, $V_{7b}$ in FIG. 6.

In practice, however, the control signals $R_{cont}$, $B_{cont}$ are limited respectively to $V_{3r}$, $V_{3b}$ by the function of the limiting circuit 12, so that, after the correction of white balance, the white and blue points do not move to $W_1$, $B_1$ on FIG. 5 but respectively remain at $W_2$, $B_2$. The aberrations of the white point $W_2$ and the blue point $B_2$ respectively from $W_0$, $B_0$ (lengths of line segments $W_0W_0$ and $B_0B_2$) in this state are respectively defined by the differences of the signals $R_{cont}$, $B_{cont}$ from the ideal values, namely $(V_{3r}-V_{4r})$ and $(V_{3b}-V_{4b})$.

In this case, the control singals $R_{cont}$, $B_{cont}$ which should read $V_{7r}$, $V_{7b}$ as explained above, are limited to $V_{3r}$, $V_{3b}$ by the effective function of the limiting circuit 12, so that the aberrations of the white point $W_2$ and the blue point $B_2$ from $W_0$, $B_0$ do not become excessively large.

However the limiting circuit 12 does not function effectively for example in the following two cases, and the correction error of the white balance becomes not negligible in such situations.

(1) Let us consider a situation where the object 1 is illuminated with light of a low color temperature, for example of 2000° K. In such state the values of the control signals $R_{cont}$, $B_{cont}$ which bring the white point to the center of the vector chart shown in FIG. 5 are $V_{2r}$, $V_{2b}$ as shown in FIG. 6. On the other hand, if said object 1 is taken under the function of the white balance correction device 14, the negative feedback loop thereof functions so as to reduce the (R-B) signal component of the object to zero, as explained before. Consequently, when said negative feedback operation is stabilized, the white and blue points eventually reach, as in the foregoing example, positions $W_1$, $B_1$ satisfying a condition: line segment $W_0W_1$=line segment $B_1A$=line segment $B_0B_1$.

In this state, the signals $R_{cont}$, $B_{cont}$ released from the white balance correction device 14 have values $V_{5r}$, $V_{5b}$ shown in FIG. 6.

Thus, since the control signals $R_{cont}$, $B_{cont}$ from the white balance correction device 14 are $V_{5r}$, $V_{5b}$ instead of proper $V_{2r}$, $V_{2b}$, the white and blue points on FIG. 5 are aberrated from $W_0$, $B_0$ by line segments $W_0W_1$ and $B_0B_1$ corresponding to the differences $(V_{5r}-V_{2r})$ and $(V_{5b}-V_{2b})$ in said control signals. In this case, since there is no limit for preventing the control signals $R_{cont}$, $B_{cont}$ from increasing to $V_{5r}$, $V_{5b}$, the white and blue points $W_1$, $B_1$ are aberrated from the properly corrected positions $W_0$, $B_0$ more significantly than in the foregoing example, so that the originally white area appears as pale orange while the originally blue area appears as pale blue.

(2) Also an object 2 consisting of a white area by 50% and a yellow area by 50% as shown in FIG. 7 leads to the following drawback.

It is assumed that said object 2 is illuminated with light of a high color temperature, for example of 9000° K. In such state, the values of the control signals $R_{cont}$, $B_{cont}$ bringing the white point to the center of a vector chart shown in FIG. 8 are $V_{4r}$, $V_{4b}$ shown in FIG. 6. Thus, when the object 2 is taken with the proper white balance correction at $R_{cont}=V_{4r}$ and $B_{cont}=V_{4b}$, the white and yellow points appear at $W_0$, $Ye_0$ shown in FIG. 8.

If the white balance correction device 14 is activated in this state, the negative feedback loop thereof so functions as to reduce the (R-B) signal component of the object to zero, so that the white and yellow points eventually reach positions $W_3$ and $Ye_1$ satisfying a condition: line segment $W_0W_3$=line segment $Ye_1B$=line segment $Ye_0Ye_1$, when said negative feedback operation is stabilized.

In this state, the control signals $R_{cont}$, $B_{cont}$ released from the white balance correction device 14 have values $V_{6r}$, $V_{6b}$ shown in FIG. 6.

Thus, since the control signal $R_{cont}$, $B_{cont}$ from the white balance correction device 14 are $V_{6r}$, $V_{6b}$ instead of proper $V_{4r}$, $V_{4b}$, the white and yellow points on FIG. 8 are aberrated from $W_0$, $Y_0$ by line segments $W_0W_3$ and $Ye_0Ye_1$ corresponding to the differences $(V_{6r}-V_{4r})$ and $(V_{6b}-V_{4b})$ in said control signals. In this case, since there is not limit for preventing the control signals $R_{cont}$, $B_{cont}$ from decreasing to $V_{6r}$, $V_{6b}$, the white and yellow points $W_1$, $Ye_1$ are aberrated from the properly corrected positions $W_0$, $Ye_0$ significantly as in the foregoing case (1), so that the originally white area appears bluish and the originally yellow area appears paler.

FIG. 9 shows the configuration of a image pickup apparatus capable of further reducing the undesirable influence of a single object of high saturation on the white balance control. In FIG. 9, same components as those in FIG. 1 are represented by same numbers.

The image pickup apparatus shown in FIG. 9 is designed to only extract signals suitable for white balance control.

FIG. 10 is a color difference vector representation of the color video signal, for explaining the signals extracted in the apparatus of FIG. 9. If a color video signal obtained by taking a white object at a color temperature of 10000° K with appropriate white balance corresponds to a point P0, a color video signal obtained from the same object taken at a color temperature of 3000° K corresponds to a point P1.

On the other hand, if a color video signal obtained by taking the white object at a color temperature of 3000° K with appropriate white balance corresponds to the point P0, a color video signal obtained from the same object at a color temperature of 10000° K corresponds to a point P2.

Thus, the color of the color video signal varies along a thick line A in FIG. 10 when the white object changes in the color temperature.

When this color difference vector is represented in a two-dimensional coordinate system:

$X=(R-Y)-(B-Y)=R-B$ $y=(R-Y)+(B-Y)=R+B-2Y,$ y-coordinate is little affected by the color temperature, and x-coordinate alone varies by the color temperature.

Let us consider, then, to control the white balance in a color temperature range of 3000° to 10000° K as explained above. The variation of a white or almost white object, in response to a change in the color temperature of 3000 to 10000° K, can be anticipated within a range $(c \geq x \geq d)$ in the x-direction and a range $(a \geq y \geq b)$ around the thick line A in the y-direction, or a hatched area SI in FIG. 10.

The image pickup apparatus shown in FIG. 9 is designed according to such concept, and the function of said apparatus will be explained in the following.

Light from an object, entering through a lens 21 and an iris (diaphragm) 22 is photoelectrically converted in an image pickup device 1, and a signal obtained by said photoelectric conversion is supplied to a luminance signal/chromaticity signal generating circuit 2, which generates a high frequency component YH and a low frequency component YL of Y signal, an R signal and a B signal. Among these signals, the R and B signals are respectively supplied to gain control circuits 3, 4.

The gain control circuits 3, 4 respectively amplify the R and B signals with gains determined by control signals $R_{cont}$, $B_{cont}$ supplied from an automatic white balance correction circuit 38, thus releasing gain controlled signals R', B'.

The R' and B' signals are supplied, together with the YL signal, to a color difference signal generating circuit 5, which generates two color difference signals (R-Y) and (B-Y). Said color difference signals are supplied, together with the YH signal, to an encoder 6 for conversion into a standard television signal, which is released from a terminal 23.

The color difference signals (R-Y), (B-Y) are also supplied to said automatic white balance correction circuit 38, which will be explained in the following.

The color difference signals (R-Y), (B-Y) are respectively supplied to clamping circuits 27, 28 for matching the DC level thereof. Thereafter said signals are supplied to a subtraction circuit 29 and an addition circuit 30. The subtraction circuit 29 calculates the difference of the color difference signals (R-Y), (B-Y) from the clamping circuit 27, 28, thereby generating the abovementioned signal x (=R−B). On the other hand, the addition circuit 30 calculates the sum of said signals thereby generating the abovementioned signal y (=R+B−2Y).

Comparators 31, 32 compare the y signal with reference levels corresponding to a, b in FIG. 10. The comparator 31 releases a low (L) or high (H) level output signal for supply to an OR circuit 33, respectively if a≧y or a≦y. The comparator 32 releases a low or high level output signal respectively if y≧b or y≦b. Consequently the output of the OR circuit 33, controlling a gate circuit 34, assumes a low level state only when the y signal is in a range a≧y≧b, but otherwise assumes a high level state.

On the other hand, the x signal released from the subtraction circuit 29 is intercepted or transmitted by the gate circuit 34 respectively when the output signal of the OR gate 33 is the high or low level state. Thus the output signal from the gate circuit 34 is supplied to a control signal generating circuit 36, after clipping of portions c<x and d>x by a clipping circuit 35.

The control signal generating circuit 36 generates a correction signal z for controlling the gain control circuits 3, 4 in such a manner that the average of the input signal becomes equal to a reference potential, corresponding to a state with white balance.

The correction signal z is supplied to a tracking correction circuit 13, and is corrected therein so as to effect white balance control along the trajectory of the color video signal responding to the change of color temperature, thereby providing the control signals $R_{cont}$ and $B_{cont}$, which control the gains of the gain control circuits 3, 4.

In the image pickup apparatus of the above-explained configuration, since the signal x from the subtractor 29 is extracted only when the signal y is positioned within a range b≦y≦a, so that the white balance control signal z is not affected by a colored object portion. Also thus extracted signal x is limited within a predetermined range by the clipping circuit, and is prevented from unnecessary gain control. Based on these facts, the white balance correction can be attained without the influence of the colored objects.

However, in the above-explained image pickup apparatus shown in FIG. 9, the colored and colorless objects are clearly distinguished by a predetermined boundary, and, whether the white balance can be attained depends on a slight difference in the saturation or hue. Also the hue of the output color video signal may vary by a slight change of the object.

For example, in case the object is composed of orange and blue colors, the color difference vectors for orange and blue respectively correspond to points Pa and Pb shown in FIG. 11. Since these points are both positioned within the above-mentioned hatched area SI, the white balance becomes stabilized in this state. However, if the orange color difference vector varies to a point Pa' outside said hatched area SI in FIG. 11, the signal from the original object portion is reflected in the white balance correction.

Consequently the white balance correction is conducted solely with the blue object portion, whereby the color difference vector representing the blue object portion is shifted from the point Pb to Pb', and the white balance becomes aberrated. This means that the white balance correcting function is significantly affected by a slight change in the hue, resulting from a variation in the image frame at the phototaking operation, a fluctuation among the cameras or a movement of the object.

The white balance correction is required for responding to the variation in the color temperature, but the range of video signal corresponding to a nearly white object also varies with such variation of the color temperature. Since the image pickup apparatus shown in FIG. 9 only employs the signals within the hatched area SI for white balance correction, the video signal corresponding to a same object may be employed or not for white balance correction, depending on the color temperature.

For this reason, the white balance correction may become different from the desired correction, depending on the color temperature. More specifically, depending on the color temperature, a colored object may have a color difference vector within the hatched area. For example, under illumination of a high color temperature, the light from the object tends to have a color difference vector with an enhanced blue component, whereby the color difference vector of a reddish object often enters the hatched area, and said reddish color is not reproduced but appears in faded state. Similarly, under a low color temperature, the bluish colors appear faded.

SUMMARY OF THE INVENTION

In consideration of the foregoing, an object of the present invention is to provide an image 1 pickup apparatus with white balance controlling function capable of resolving the above-mentioned drawbacks.

Another object of the present invention is to provide an image pickup apparatus capable of white balance control providing little visual error in white balance correction and matching the object to be taken.

The above-mentioned objects can be attained, according to an embodiment of the present invention, by an image pickup apparatus comprising:

a) image pickup means for forming, from the light coming from an object, a video signal including plural color singals;

b) gain control means for receiving a gain control signal, and controlling the gains of said plural color signals according to said gain control signal; and c) calculation means for calculating color temperature information relative to the color temperature, based on said plural color signals, and forming said gain control signal according to said color temperature information;

wherein said calculation means includes range setting means for setting the variable range of said gain control signal, at either one of mutually non-overlapping plural ranges.

Still another object of the present invention is to provide an image pickup apparatus capable of stable white balance control, which is not affected by the image frame at the phototaking operation, movement of the object or a slight change in the color temperature and not influenced by the object.

The above-mentioned object can be attained, according an embodiment of the present invention by an image pickup apparatus, comprising:

a) image pickup means for forming, from the light coming from an object, a video signal including plural color signals;

b) gain control means for receiving gain control signals, and controlling the gains of said plural color signals according to said gain control signal; and c) calculation means for forming said gain control signal according to plural color information relating to said plural color signals;

wherein said calculation means includes weighting means for weighting said plural color information with a coefficient which is determined by the value of said plural color signals and which can assume at least three values, and calculates said gain control signal, according to said plural color information weighted by said weighting means.

Still other objects of the present invention, and the features thereof, will become fully apparent from the following detailed description of the embodiment of the present invention.

BRIEF DESCRIPTION OF THE DRAWINGS

FIGS. 30, 31 and 32 are color difference vector charts showing the change in the white discrimination area in the image pickup apparatus shown in FIG. 22.

DETAILED DESCRIPTION OF THE PREFERRED EMBODIMENTS

Now the present invention will be clarified in detail by preferred embodiments thereof shown in the attached drawings.

1st embodiment

Figure 1:
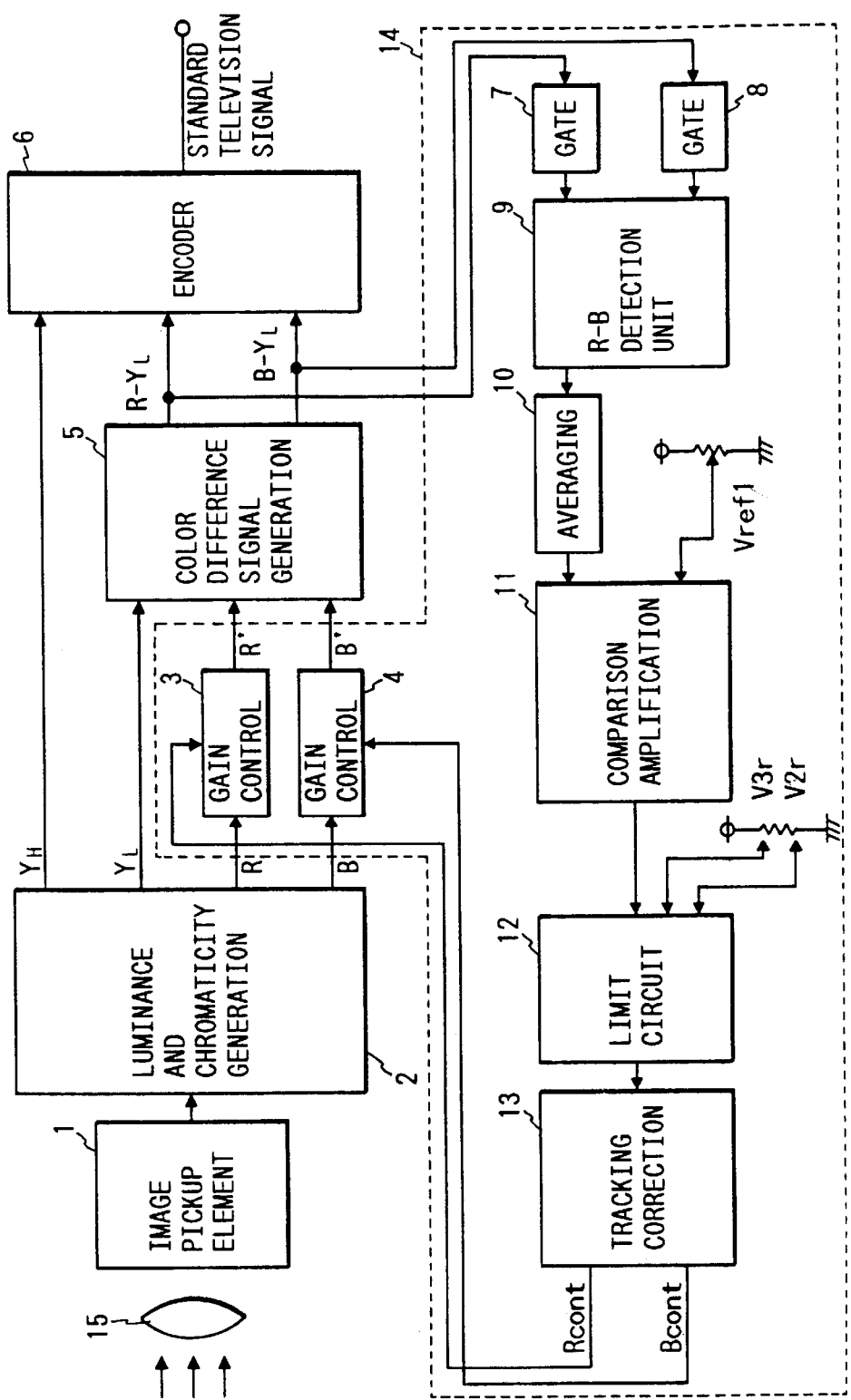
FIG. 1 is a block diagram of a prior art image pickup apparatus.
Figure 2:
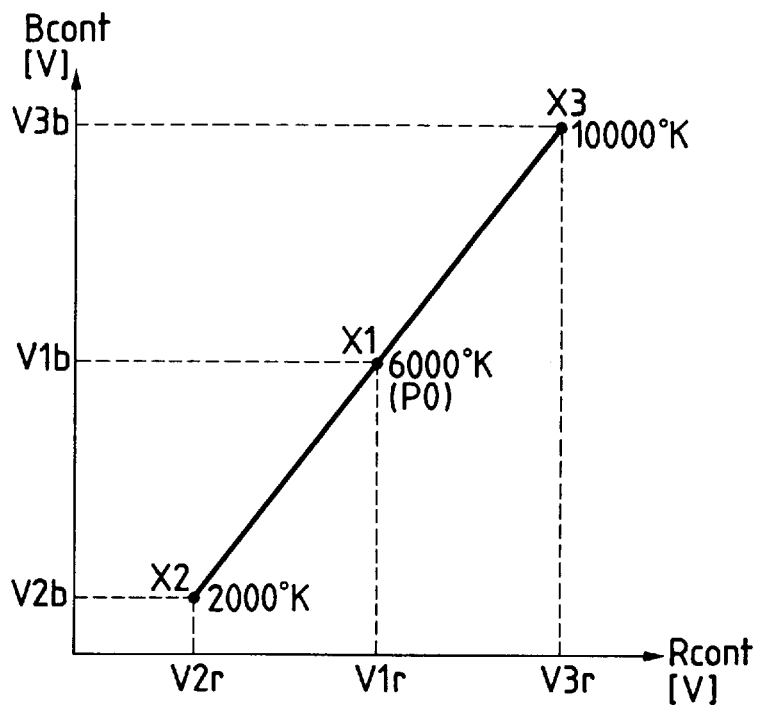
FIG. 2 is a chart showing the relation between the color temperature and a gain control signal in the apparatus shown in FIG. 1.
Figure 3:
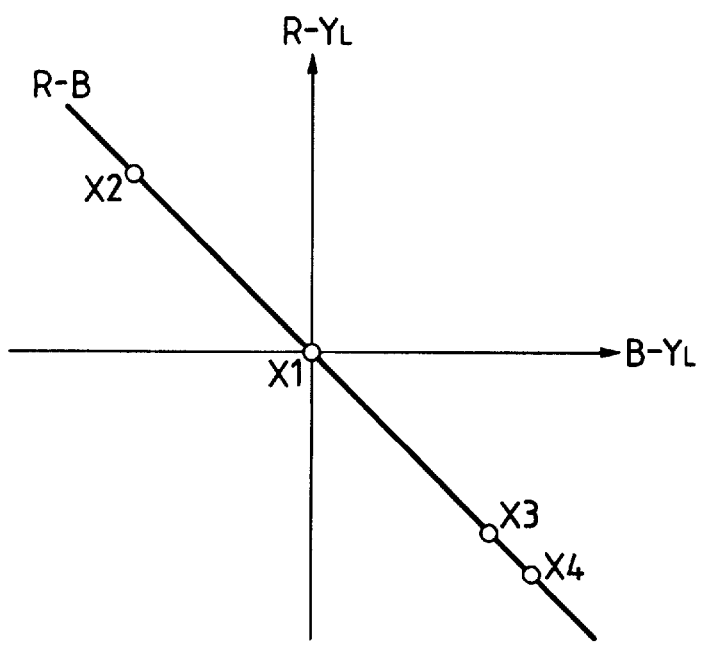
FIG. 3 is a vector chart showing the function of the apparatus shown in FIG. 1.
Figure 9:
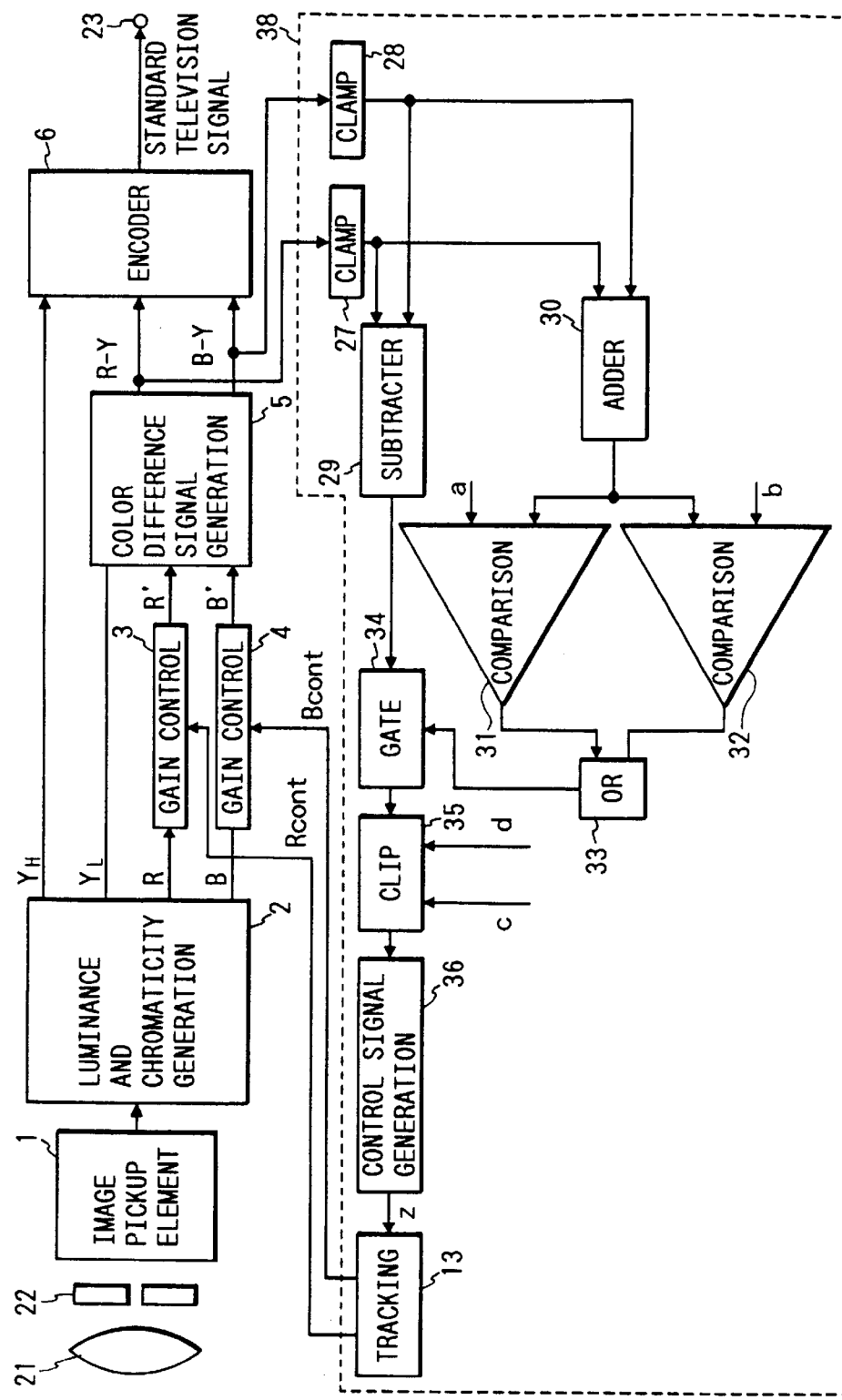
FIG. 9 is a block diagram showing another prior art image pickup apparatus.
Figure 10:
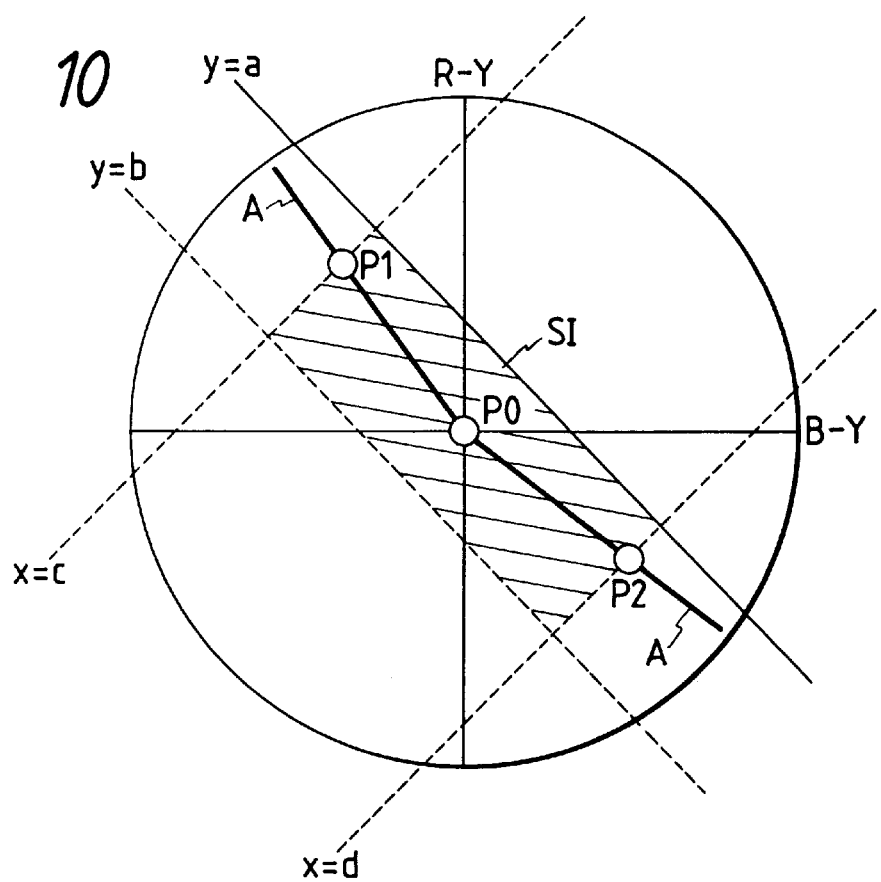
FIG. 10 is a color difference vector chart showing a white discrimination area in the image pickup apparatus shown in FIG. 9.
Figure 11:
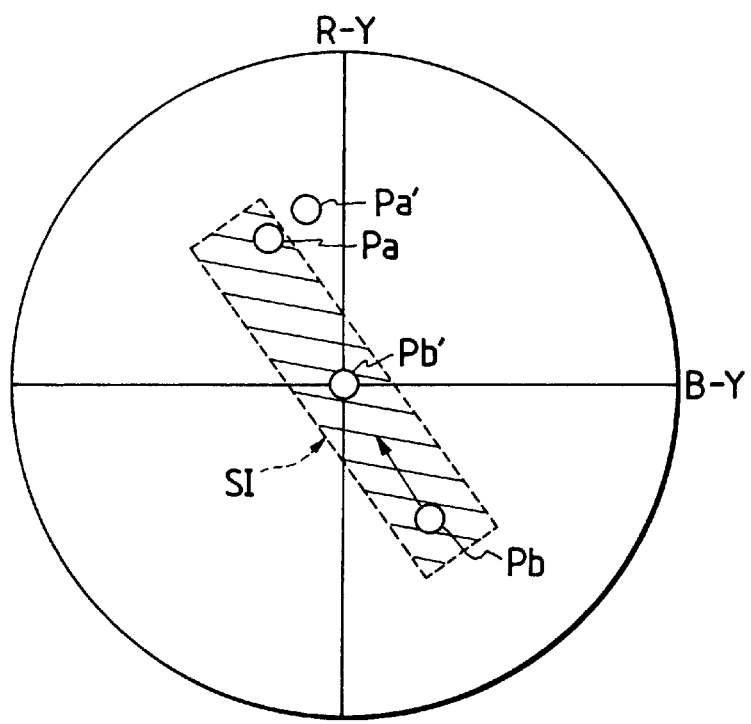
FIG. 11 is a chart showing a drawback in the apparatus shown in FIG. 9.
Figure 12:
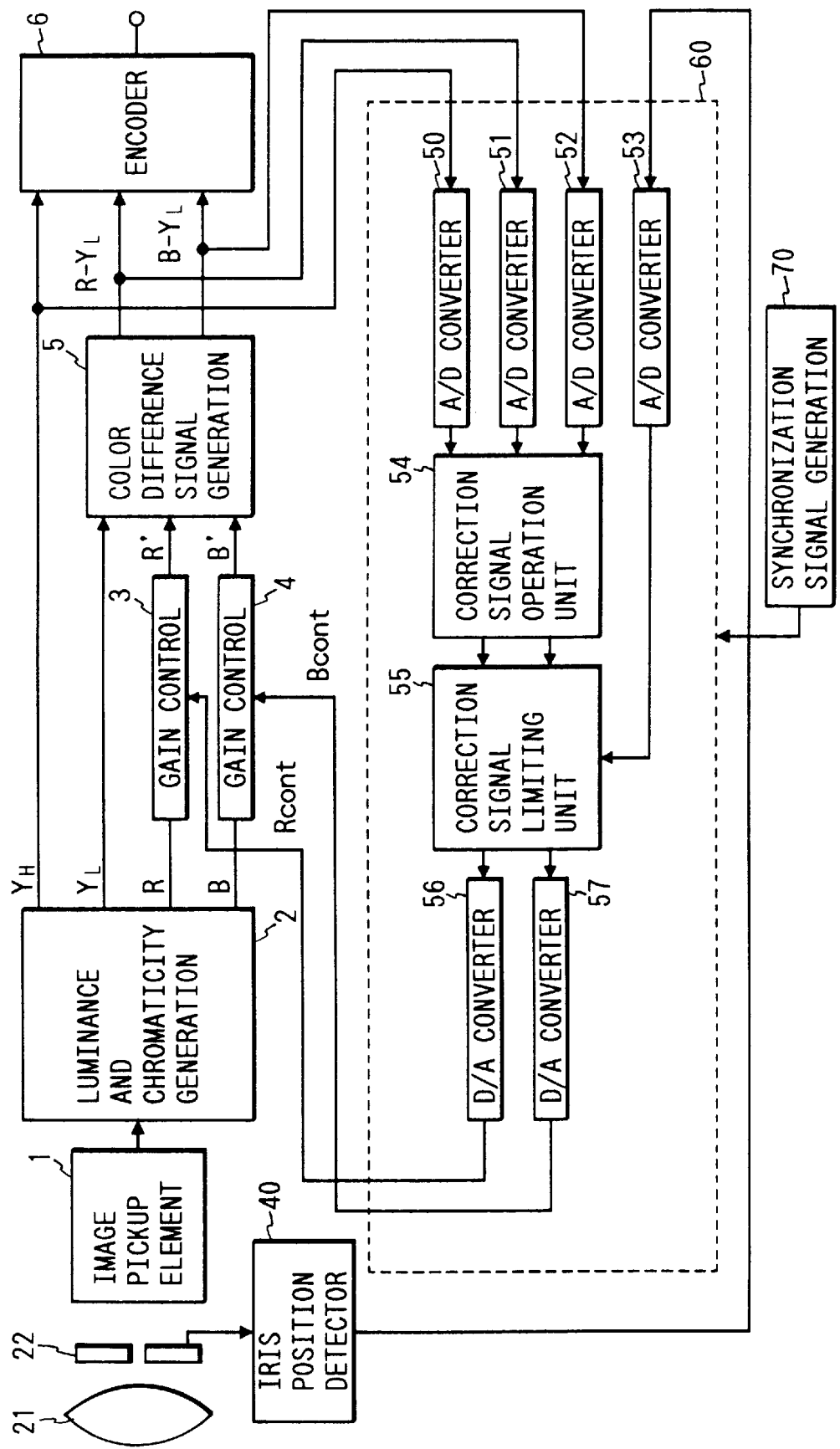
FIG. 12 is a block diagram of a first embodiment of the image pickup apparatus of the present invention.

FIG. 12 is a block diagram of an image pickup apparatus including an automatic white balance correction circuit, constituting a first embodiment of the present invention. In FIG. 12, components same as or equivalent to those in the conventional apparatus shown in FIG. 1 or 9 are represented by same symbols, and will be omitted from the following description.

In FIG. 12, there are provided an A/D converter 50 for converting an analog luminance signal YH to a digital signal; an A/D converter 51 for converting an analog (R-YL) signal into a digital signal; an A/D converter 52 for converting an analog (B-YL) signal into a digital signal; an A/D converter 53 for converting an analog output signal of an iris position detector 40, to be explained later, into a digital signal; a correction signal calculation unit 54 for calculating the (R-B) signal component of the object by eliminating unnecessary signals during the blanking period and the abnormal signals in the high luminance areas, based on the data from the A/D converters 50, 51, 52, 53, and calculating a digital value for bringing the (R-B) signal component; a correction signal limiting unit 55 for limiting the output data from the correction signal calculation unit 54, based on the iris position data from the A/D converter 53; a D/A converter 56 for converting the digital signal from the correction signal limiting unit 55 into an analog signal constituting the control signal $R_{cont}$; and a D/A converter 57 for converting the digital signal from the correction signal limiting unit 55 into an analog signal constituting the control signal $B_{cont}$. These components 50–57 are constructed in the microcomputer 60. The iris position detector 40 is composed for example of a Hall element.

Figure 14:
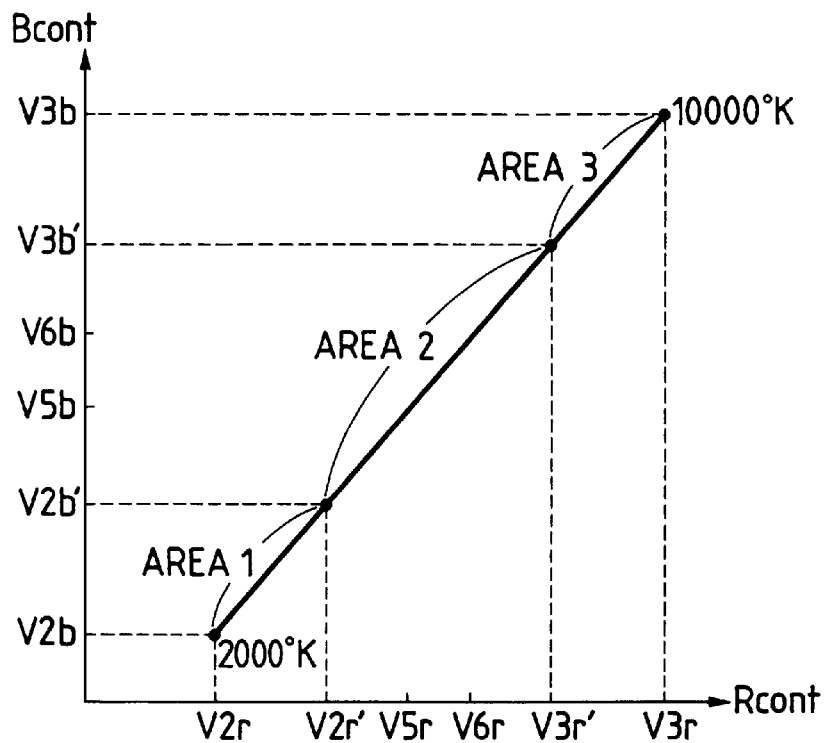
FIG. 14 is a chart showing the relation between the color temperature and a gain control signal in a data table provided in a microcomputer of the apparatus shown in FIG. 12.

In the following there will be explained the function of the correction signal calculation unit 54. Said calculation unit 54 receives data YHD digitized from the signal YH in the A/D converter 50, data RYD digitized from the signal (R-YL) in the A/D converter 51, and data BYD digitized from the signal (B-YL) in the A/D converter 52. These A/D converters 50–53, capable of high-speed function, can finely digitize the input signals. Also since the microcomputer 60 receives the synchronization signals from a synchronization signal generator 70, the correction signal calculation unit 54 can eliminate the unnecessary signals during the blanking period and the abnormal signals in the high luminance areas, and can calculate the (R-B) signal component of the object. Furthermore, the microcomputer 60 is provided therein with a data table as shown in FIG. 14, and can calculate the white balance correction data by comparing the (R-B) signal component with data corresponding to $V_{ref1}$ in FIG. 1, based on said data table, thereby sending the control signals $R_{cont}$, $B_{cont}$ to the correction signal limiting unit 25.

Figure 13:
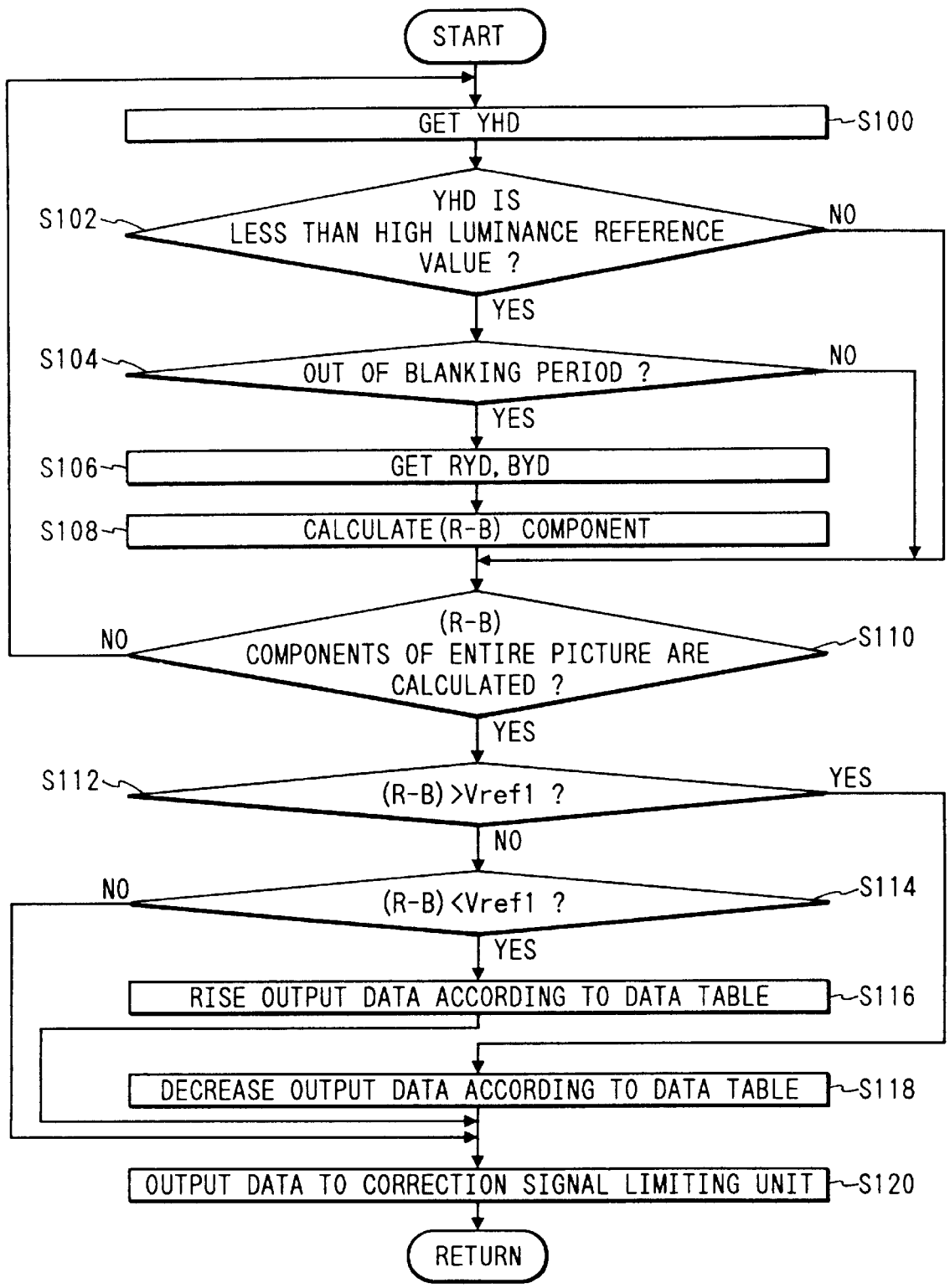
FIG. 13 is a flow chart showing the control sequence of a correction signal calculation unit in the apparatus shown in FIG. 12.

The function of said correction signal calculation unit 54 will be further clarified, with reference to a flow chart shown in FIG. 13.

At first in a step S100, the YHD signal from the A/D converter 50 is fetched in the correction signal calculation unit 54. In a step S102, the correction signal calculation unit 54 discriminates whether the level of the fetched YHD signal is lower than a reference value for high luminance. If the level of said YHD signal is at least equal to said reference, the sequence proceeds to a step S110.

On the other hand, if the step S102 identifies that the YHD signal level is lower than said reference value, the sequence proceeds to a step S104 for discriminating whether the function of the entire image pickup apparatus is currently in a blanking period, and, if within a blanking period or not, the sequence respectively proceeds to a step S110 or S106.

In the step S106, the correction signal calculation unit 54 fetches the RYD and BYD signals from the A/D converters 51, 52. Then, in a step S108, the correction signal calculation unit 54 generates the (R-B) signal from the RYD and BYD signals fetched in the step S106.

The step S110 discriminates whether the (R-B) signal has been generated over the entire image frame, and, if not, the sequence returns to the step S100 and the sequence of steps S100 to S110 is repeated. In case the step S102 identifies that the YHD signal level is at least equal to the reference value for high luminance, or in case the step S104 identifies that the operation is within a blanking period, the sequence skips the steps S106 and S108 so that the generation of the (R-B) signal over the entire image frame is naturally incomplete in the step S110. Thus, in case the sequence proceeds to the step S110 from the step S102 or S104, it returns to the step S100.

If the step S110 identifies that the (R-B) signal has been generated over the entire image frame, the sequence proceeds to a step S112 for comparing the (R-B) signal with $V_{ref1}$. If the former is larger, indicating that the levels of the control singals $R_{cont}$, $B_{cont}$ have to be lowered in order to correct the white balance, a step S118 reduces the levels of said control signals according to the data table shown in FIG. 14, and the sequence proceeds to a step S120.

On the other hand, if the step S112 identifies that the (R-B) signal does not exceed $V_{ref1}$, a step S114 discriminates whether the (R-B) signal is smaller than $V_{ref1}$. If the step S114 identifies that the (R-B) signal is smaller than $V_{ref1}$, signifying that the levels of the control signals $R_{cont}$, $B_{cont}$ have to be elevated for correcting the white balance, a step S116 elevates the levels of said control signals according to the data table shown in FIG. 14.

Also if the step S114 identifies that the (R-B) signal is at least equal to $V_{ref1}$, the (R-B) signal level is equal to $V_{ref1}$, so that the sequence proceeds directly to the step S120.

The step S120 releases the set data of the control signals $R_{cont}$, $B_{cont}$ to the correction signal limiting unit 55, and the function of the correction signal calculation unit 54 is terminated.

In the following there will be explained the function of the correction signal limiting unit 55.

Figure 15:
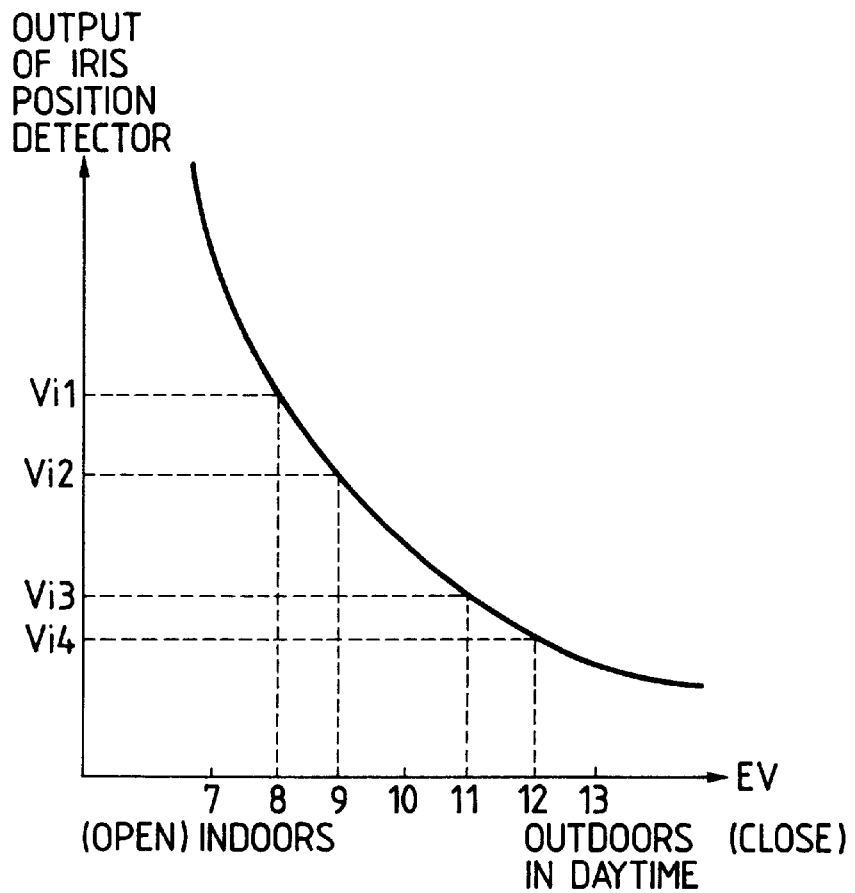
FIG. 15 is a chart showing the relation between the output of an iris position detector and the luminance in the apparatus shown in FIG. 12.

The correction signal limiting unit 55 receives a signal of which level is high or low respectively when the iris is fully open or closed, as shown in FIG. 15, from the iris position detector 40, after digitization in the A/D converter 53. According to the level of said signal, the control signals $R_{cont}$, $B_{cont}$ received from the correction signal calculation unit 54 are limited.

In general, when the color temperature is high, the light source is often outdoor daytime solar light, with a high luminance. On the other hand, when the color temperature is low, the light source is often indoor light of an incandescent lamp or solar light at sunset, with a low luminance.

Figure 16:
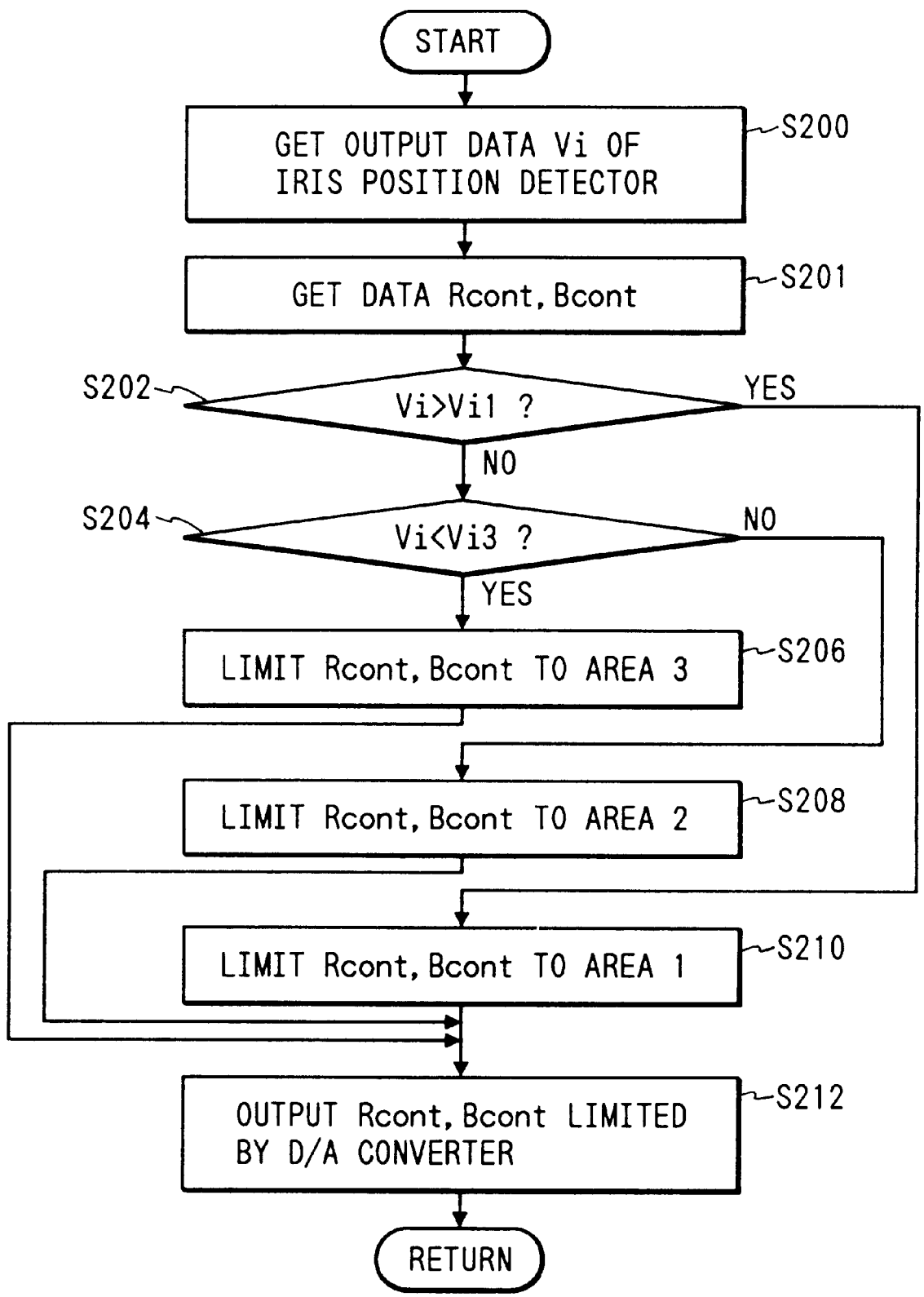
FIG. 16 is a flow chart showing the control sequence of a correction signal limiting unit in the apparatus shown in FIG. 12.

Utilizing these facts, the correction signal limiting unit 55 functions according to a flow chart shown in FIG. 16.

At first in a step S200, the correction signal limiting unit 55 fetches a signal, Vi, digitized in the A/D converter 53, from the output signal of the iris position detector. In a step S201, the correction signal limiting unit 55 fetches the control signals $R_{cont}$, $B_{cont}$ released from the correction signal calculation unit 54.

A step S202 discriminates whether the signal Vi is larger than $Vi_1$ shown in FIG. 15. If Vi is larger than $Vi_1$, indicating that the iris is widely open, the object is estimated to have a low luminance and a low color temperature. Thus the sequence proceeds to a step S210 for limiting the levels of the control signals $R_{cont}$, $B_{cont}$ within an area 1 shown in FIG. 14, then to a step S212. On the other hand, if the step S202 identifies that Vi is equal to or smaller than $Vi_1$, the sequence proceeds to a step S204.

The step S204 discriminates whether Vi is smaller than $Vi_3$ shown in FIG. 15, and, if not, the sequence proceeds to a step S208 for limiting the levels of the control signals $R_{cont}$, $B_{cont}$ within an area 2 shown in FIG. 14 and then to a step S212. If the step S204 identifies that Vi is still smaller than $Vi_3$, indicating that the aperture of the iris is very small, the object can estimated to have a high luminance and a high color temperature. Thus the sequence proceeds to a step S206 for limiting the levels of the control signals $R_{cont}$, $B_{cont}$ within an area 3 shown in FIG. 14, and then to the step S212.

The step S212 releases the limited control signals $R_{cont}$, $B_{cont}$ to the D/A converters 56, 57, and the function of the correction signal limiting unit 55 is terminated.

Figure 17:
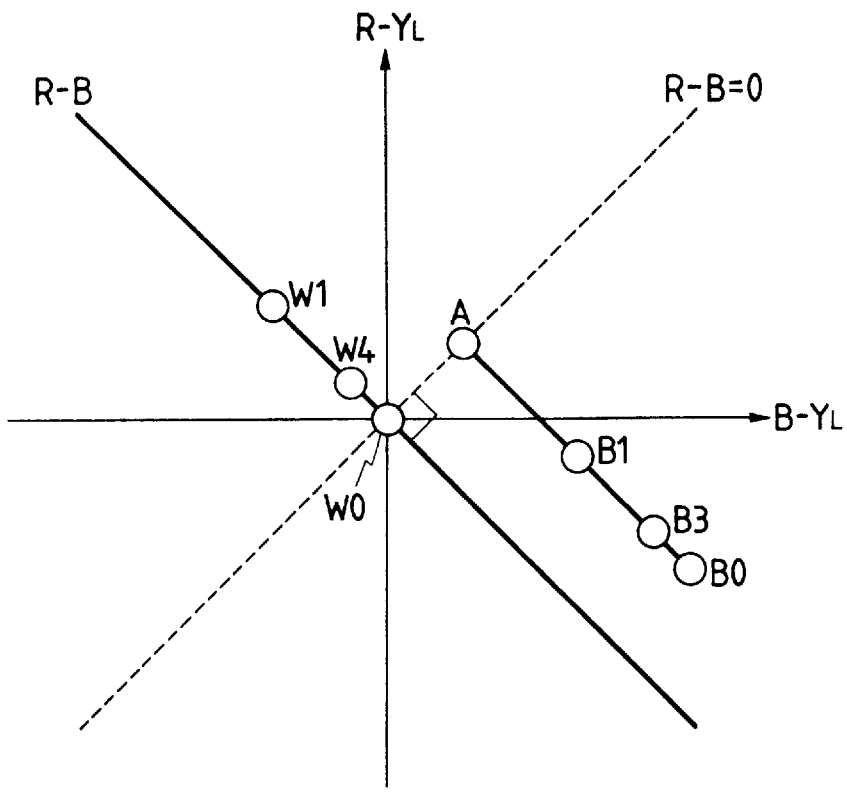
FIGS. 17 and 18 are vector charts showing a white balance correcting operation in the apparatus shown in FIG. 12.

Because of the above-explained configuration and functions, in the aforementioned situation (1), the correction signal calculation unit 54 releases the signals $R_{cont}=V_{5r}$ and $B_{cont}=V_{5b}$, but if the iris position detector releases a value equal to or larger than $Vi_1$ in a low luminance situation, the correction signal limiting unit 55 releases the signals $R_{cont}=V_{2r}$ and $B_{cont}=V_{2b}$, due to the output limitation within the area 1. These control signals are converted into analog signals in the D/A converters 56, 57 and supplied to the gain control units 3, 4. This situation will be explained in relation to a vector chart shown in FIG. 17.

Figure 4:
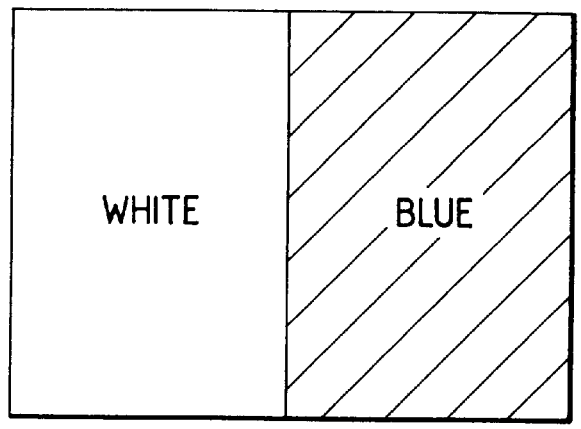
FIG. 4 is a view showing an example of the object.

In response to the object 1 shown in FIG. 4, illuminated with an incandescent lamp of a low color temperature of 2000° K, the correction signal calculation unit 54 releases the signals $R_{cont}=V_{5r}$ and $B_{cont}=V_{5b}$ for effecting the aforementioned correction to achieve a condition: line segment $B_1A$=line segment $W_0W_1$. However, because the correction signal limiting unit 55 releases the control signals $R_{cont}=V_{2r}'$ and $B_{cont}=V_{2b}'$, the white and blue colors are only corrected respectively to $W_4$ and $B_1$, so that the error in correction can be significantly reduced in comparison with the conventional case.

Figure 5:
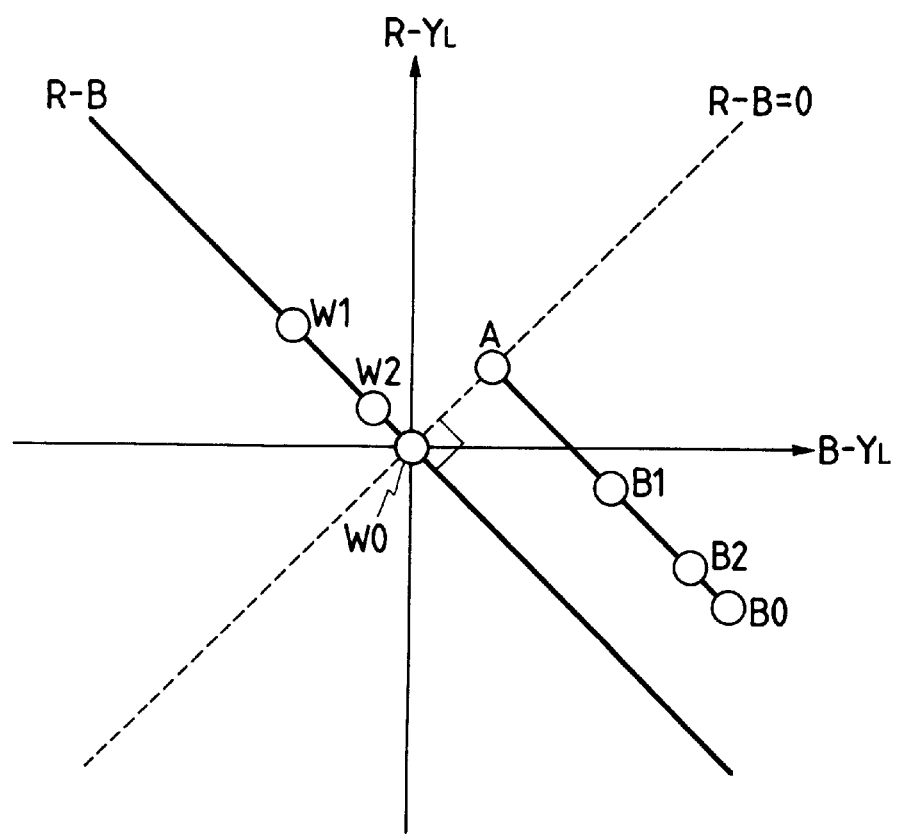
FIG. 5 is a vector chart showing the function of the apparatus shown in FIG. 1, in response to the object shown in FIG. 4.
Figure 6:
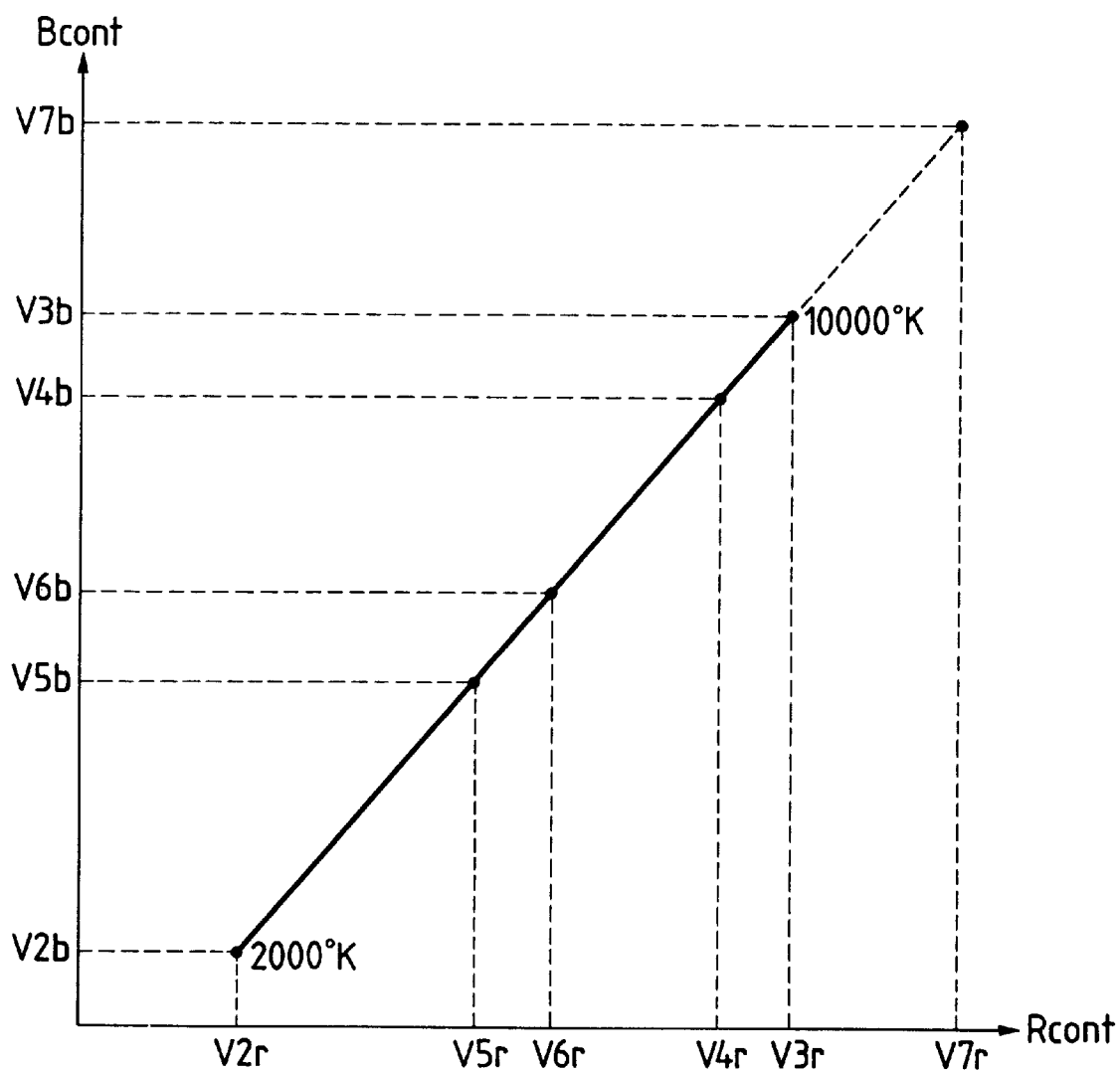
FIG. 6 is a chart showing the detailed relation between the color temperature and a gain control signal in the apparatus shown in FIG. 1.
Figure 7:
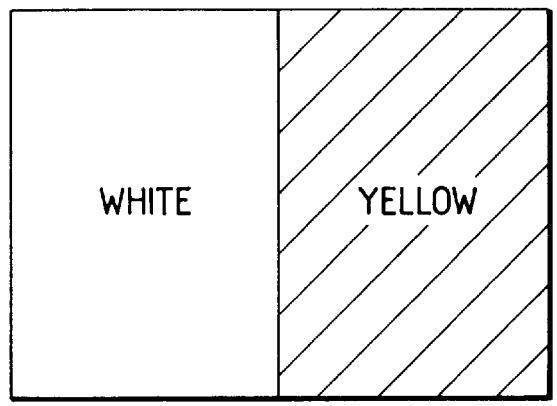
FIG. 7 is a view showing another example of the object.
Figure 8:
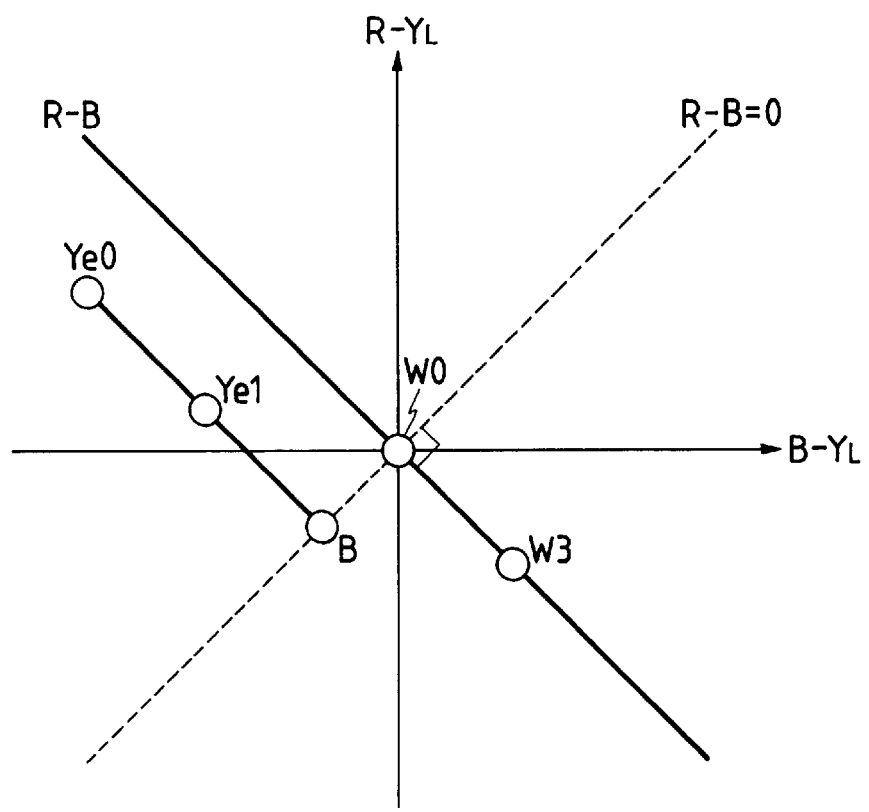
FIG. 8 is a vector chart showing the function of the apparatus shown in FIG. 1, in response to the object shown in FIG. 7.
Figure 18:
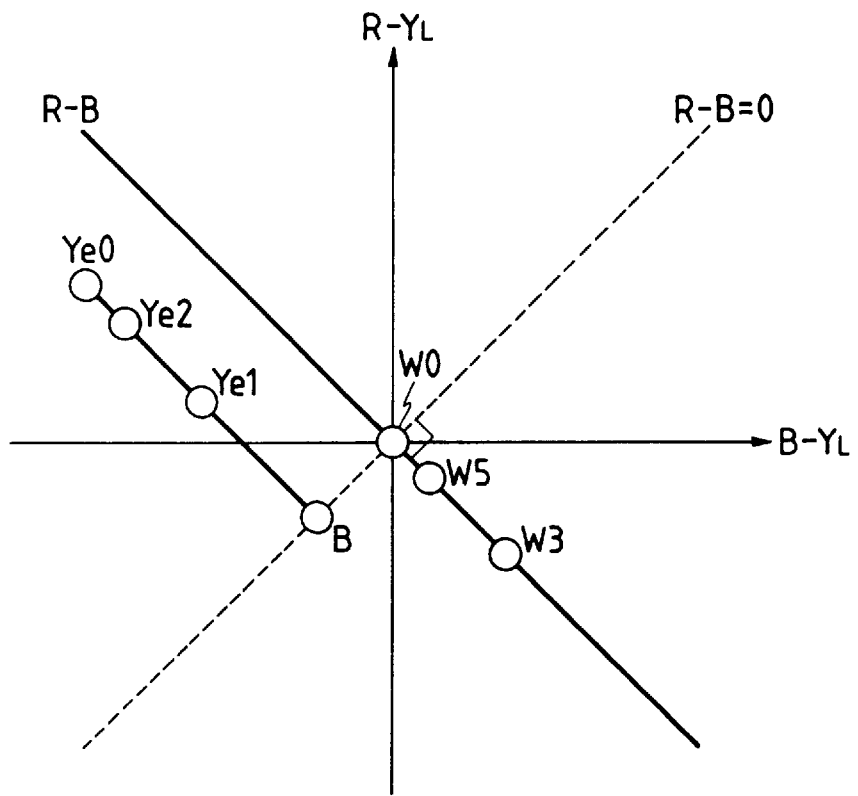

Also in the aforementioned situation (2), the correction signal calculation unit 54 releases the signals $R_{cont}=V_{6r}$, $B_{cont}=V_{6b}$, but, when the iris position detector enters a value equal to or less than $Vi_3$ because of a high luminance, the correction signal limiting unit 55 releases the signals $R_{cont}=V_{3r}$, $B_{cont}=V_{3b}$, because of the limitation within an area 3. Said control signals are converted into analog signals by the D/A converters 56, 57 and supplied to the gain control units 3, 4. Referring to a vector chart shown in FIG. 18, in response to the object 2 shown in FIG. 5, illuminated with solar light of a high color temperature, for example, of 9000° K, the correction signal calculation unit 54 releases the signals $R_{cont}=V_{6r}$, and $B_{cont}=V_{6b}$ for effecting the aforementioned correction to achieve a condition: line segment $Ye_1B$= line segment $W_0W_3$. However, because the correction signal limiting unit 55 releases the control signals $R_{cont}=V_{3r}'$ and $B_{cont}=V_{3b}$ the white and yellow colors are only corrected respectively to $W_5$ and $Ye_2$, so that the error in correction can be significantly reduced in comparison with the conventional case.

Also the output of the correction signal limiting unit 55 may be given a suitable time constant, in order to prevent rapid variation in the output when the limiting range varies for example from the area 3 to 1. In this manner a natural correction can be obtained, since the white balance does not vary rapidly.

Though the present embodiment employs three areas, it is also possible to utilize more finely divided areas. Also sufficient improvement can be obtained by employing only two areas.

2nd Embodiment

In the following there will be explained a second embodiment of the image pickup apparatus of the present invention, wherein the configuration of the apparatus is identical with that in the first embodiment, and will not, therefore, be explained further. It is different from the first embodiment, in the function of the correction signal limiting unit 55.

This second embodiment is designed to provide proper white balance correction for certain rare situations which cannot be properly corrected by the first embodiment, such as an object of a low luminance and a high color temperature (such as an outdoor object in the shadow of a tree), or an object of a high luminance and a low color temperature (such as an object illuminated with a halogen lamp).

Figure 19:
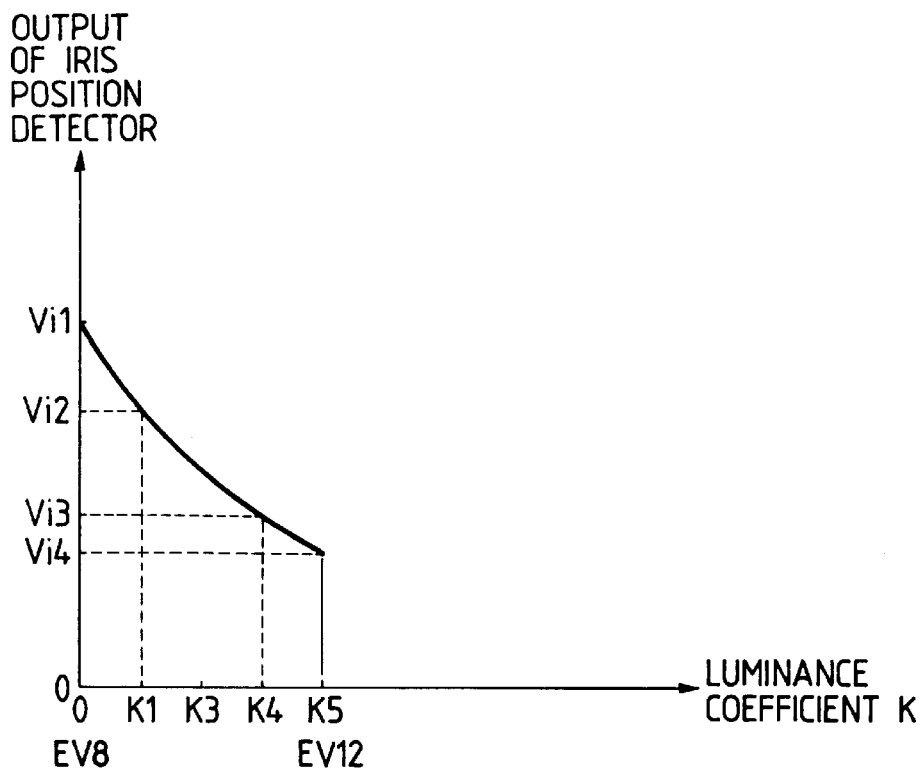
FIG. 19 is a chart showing the relation between the output of an iris position detector and a luminance coefficient in a second embodiment of the present invention.

FIG. 19 shows a data table, provided in the microcomputer 60 and showing the relation between the output data of the iris position detector, released from the A/D converter 53, and the luminance coefficient K. Said coefficient K is zero when the luminance is equal to or lower the EV8, namely when the output of the iris position detector is equal to or higher than $Vi_1$, and increases with the increase in luminance, reaching a value K5 at a luminance equal to or higher than EV12.

Figure 20:
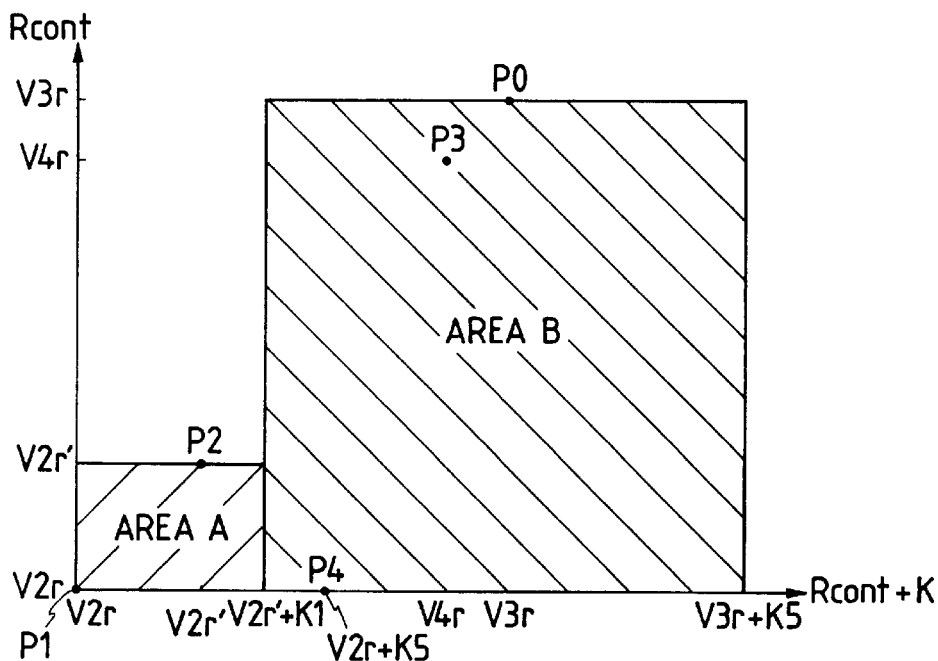
FIG. 20 is a view showing a data table representing the function of a correction signal limiting unit in the second embodiment of the present invention.

FIG. 20 shows a data table, indicating the function of the correction signal limiting unit 55 provided in the microcomputer 60. The ordinate of FIG. 20 indicates the signal $R_{cont}$, while the abscissa indicates the sum of the luminance coefficient determined in FIG. 19 and the white balance correction signal $R_{cont}$ and the control range of the control signal $R_{cont}$ is divided into two areas according to said sum. In an area A the signal $R_{cont}$ is variable in a range $V_{2r}$–$V_{2r}'$, and in an area B the signal $R_{cont}$ is variable in a range $V_{2r}$–$V_{3r}$. The control signal $B_{cont}$, corresponding to thus limited control signal $R_{cont}$, is calculated from the data table shown in FIG. 14.

At the start of the white balance correcting operation, the signals $R_{cont}$, $B_{cont}$ start from initial values $V_{3r}$, $V_{3b}$.

In the following, the function of two data tables shown in FIGS. 19 and 20, and of the correction signal control unit 55 with three examples.

EXAMPLE 1

In case an entirely white image frame, illuminated with light of a low luminance and a low color temperature (for example less than EV8; 2000° K) is taken and the white balancing operation is conducted, the control signal $R_{cont}$ is initially positioned at P0 in FIG. 20 ($R_{cont}+K=V_{3r}$, where K==0). Then, when the white balance correcting operation is stabilized, the correction signals reach $R_{cont}=V_{2r}$, $B_{cont}=V_{2b}$ at a point P1 in FIG. 20 ($R_{cont}+K=V_{2r}$, where K=0).

If blue color is introduced into the object as in FIG. 4, the white balance correction signals tend to increase to $R_{cont}=V_{5r}$, $B_{cont}=V_{5b}$ as explained before, but remain at $V_{2r}$, $V_{2b}$ since the maximum value of $R_{cont}$ in the area A is $V_{2r}$. Thus the white balance correction with little error can be attained as in the first embodiment. This situation corresponds to a point P2 in FIG. 20 ($R_{cont}+K=V_{2r}$, where K=0).

EXAMPLE 2

In case a white object of a low luminance and a high color temperature (for example less than EV8; 9000° K) is taken and the white balancing operation is conducted, the control signal $R_{cont}$ is initially positioned at P0 in FIG. 20. When the white balance correcting operation is thereafter stabilized, the correction signals reach $R_{cont}=V_{4r}$, $B_{cont}=V_{4b}$ to provide proper white balance correction, corresponding to a point P3 in FIG. 20 ($R_{cont}+K=V_{4r}$; where K=0).

EXAMPLE 3

In case a white object of a high luminance and a low color temperature (for example equal to or higher than EV12; 2000° K) is taken and the white balancing operation is conducted, the control signal $R_{cont}$ is initially positioned at P0 in FIG. 20. When the white balance correcting operation is thereafter stabilized, the correction signals reach $R_{cont}=V_{2r}$, $B_{cont}=V_{2b}$ corresponding to P4 in FIG. 20 ($R_{cont}=V_{2r}$, K=K5), thus providing proper white balance correction.

Thus the white balance correction starts from the wider area B, and thereafter enters the narrower area A according to the condition of the object, as shown in the example 1, thereby reducing the error in correction.

In this embodiment, once the correcting operation enters the area A, it does not return to the area B unless the luminance coefficient K becomes at least equal to K4, or the signal $R_{cont}$ becomes at least equal to $V_{2r}$, and the luminance coefficient K becomes at least equal to K1. Stated differently, the entry into the area B occurs only when the sum of the white balance control value and the luminance coefficient reach a given value. Though this embodiment employs two areas, it is also possible to a larger number of areas. Also the iris position detector 40 may naturally be replaced by a luminance sensor capable of detecting the object luminance.

3rd Embodiment

Figure 21:
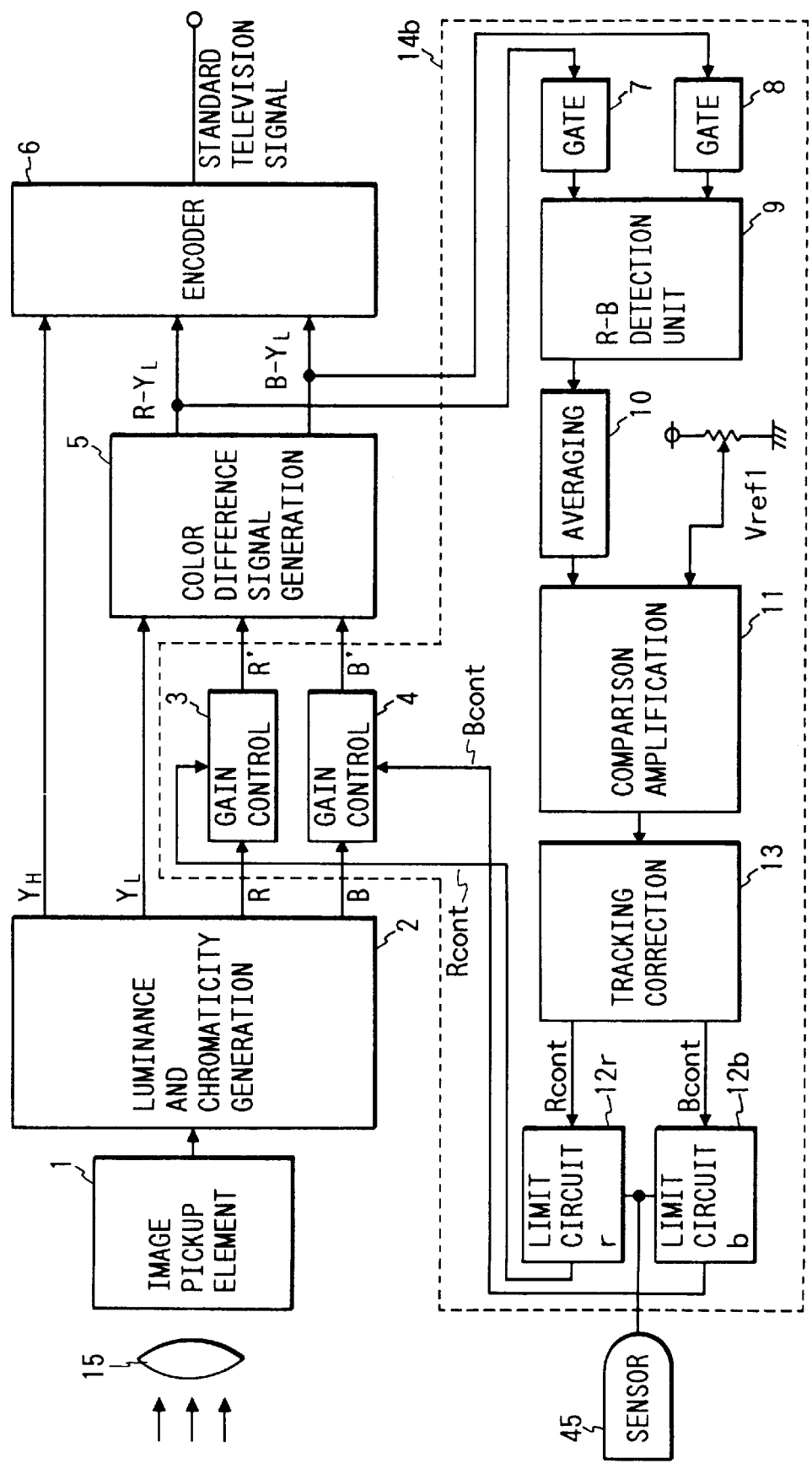
FIG. 21 is a block diagram of a third embodiment of the image pickup apparatus of the present invention.

FIG. 21 is a block diagram of a third embodiment of the image pickup apparatus of the present invention, wherein the iris position detector 40 is replaced by a luminance sensor 45. Limiting circuits 12*r*, 12*b* are provided for limiting the signals $R_{cont}$, $B_{cont}$ according to the output of the luminance sensor 45.

Also in this case, the white balance correction as in the first embodiment can be attained by employing the limiting area 1 shown in FIG. 14 if the external luminance is detected equal to or lower than EV8, the area 3 shown in FIG. 14 in case the external luminance is equal to or higher than EV11, and the area 2 otherwise.

The above-explained embodiment can be modified or varied within the spirit and scope of the present invention.

Figure 22:
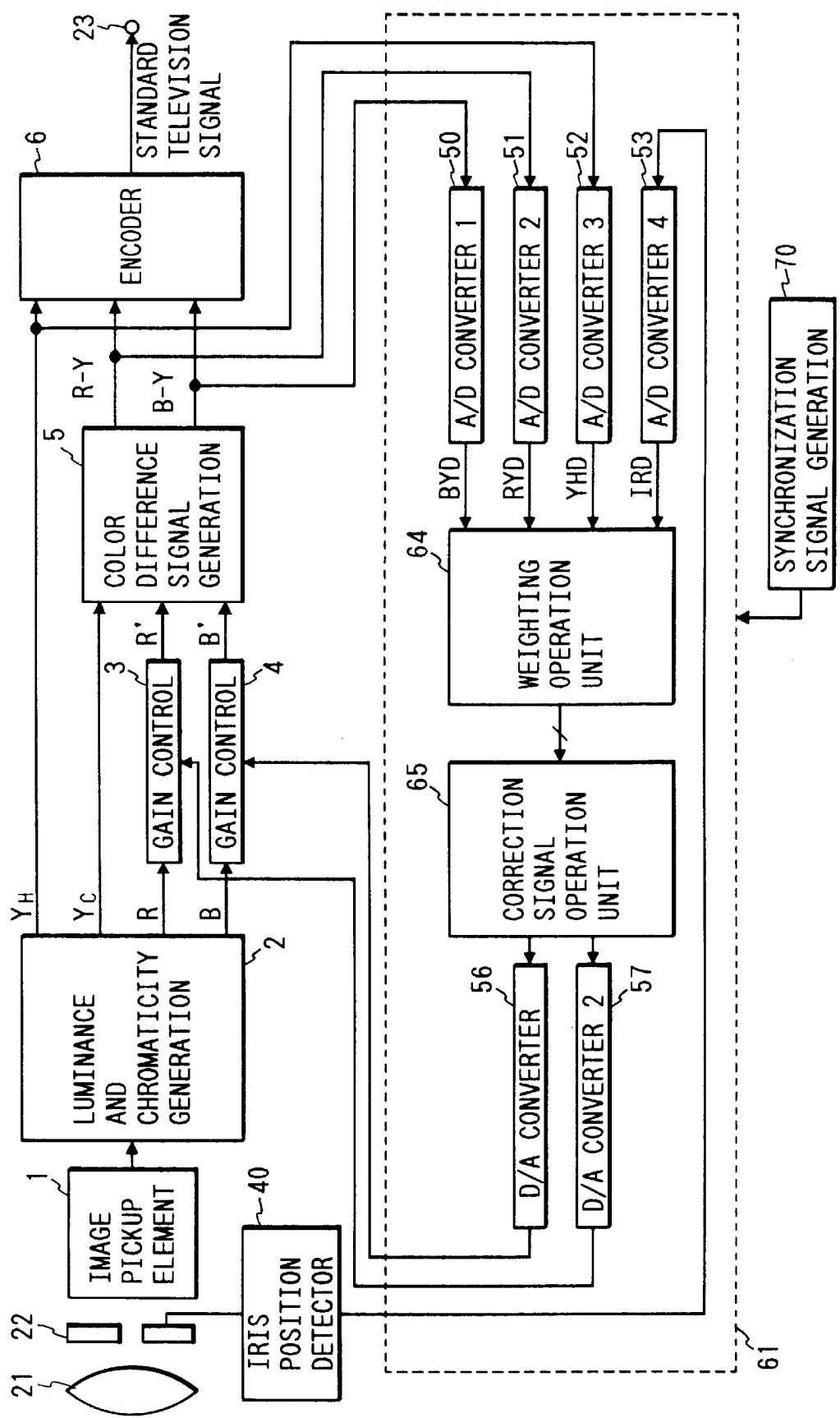
FIG. 22 is a block diagram showing an essential part of a fourth embodiment of the image pickup apparatus of the present invention.

The above-explained first, second or third embodiment of the image pickup apparatus of the present invention limits the control ranges of the gains of the different colors according to the luminance level of the object, thereby reducing the error, namely excessive or deficient correction of the white balance even in case the object contains a large proportion of a single color, thereby realizing visually satisfactory white balance correction. ps 4th Embodiment FIG. 22 is a block diagram showing an essential part of a 4th embodiment of the image pickup apparatus of the present invention, wherein components same as or equivalent to those shown in FIG. 9 or 12 are represented by same numbers and are omitted from the following description.

In FIG. 22 there are shown a weighting calculation unit 64 for receiving the outputs of the aforementioned A/D converters 50–53 and effecting the weighting for white balance control as will be explained later; a correction signal calculation unit 65 for receiving a signal from the weighting calculation unit 64 and forming control signals for white balance correction; and D/A converters 56, 57 for converting digital correction signal, from the correction signal calculation unit, into analog signals.

The D/A converters 56, 57 supply the gain control circuit 3 for controlling the gain of the R signal, and the gain control circuit 4 for controlling the gain of the B signal, respectively with the control signals $R_{cont}$ $B_{cont}$.

Figure 23:
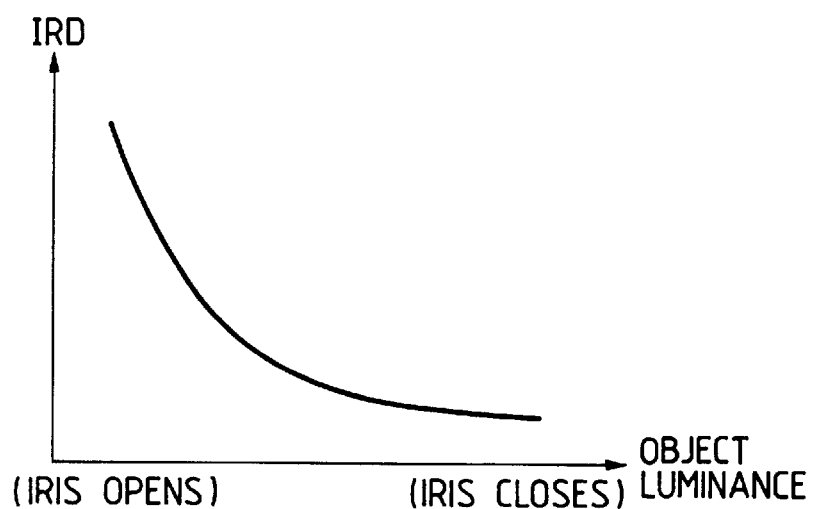
FIG. 23 is a chart showing the function of an iris position detector in the image pickup appaaratus shown in FIG. 22.

The iris position detector 40, consisting for example of a Hall element, detects the position of the iris 22, and releases a signal of which level is high or low respectively when the iris is open or closed, as shown in FIG. 23, for supply to the A/D converter 53.

The above-mentioned components 64, 65 are illustrated as hardwares for facilitating the understanding of the present embodiment, but in fact are constructed in a microcomputer 61, which receives synchronization signals, from the synchronization signal generator 70, for addition to the standard television signal to be released from the terminal 23, for defining the timings necessary for various calculations.

The weighting calculation unit 64 receives data YHD, digitized from the YH signal in the A/D converter 50, data RYD, digitized from the (R-Y) signal in the A/D converter 51, data BYD, digitized from the (B-Y) signal in the A/D converter 52, and data IRD released from the iris position detector 40 and digitized in the A/D converter 53. These A/D converters 50–53, being capable of high-speed operation, can digitize the input video signal in small area units.

Also the above-mentioned synchronization signals are supplied to the microcomputer 61, and are utilized in the weighting calculation unit 64 for excluding the unnecessary portion of the video signal corresponding to the blanking period from the calculation process.

Therefore the weighting calculation unit 64 effects the calculation utilizing the signals RYD, BYD and YHD excluding said blanking period. A further detailed explanation will be given in the following on the function of said weighting calculation unit 64.

At first the weighting calculation unit 64 calculates the x (=R−B) component and y (=R+B−2Y) component in each of the above-mentioned small areas, based on the A/D converted RYD and BYD signals.

It then determines the weighting coefficient K for RYD and BYD, based on said y and x components and the YHD signal. In the present embodiment, the relation between said weighting coefficient and the y and x components is variably determined according to IRD, as will be explained later, but in the following there will be explained, for the purpose of simplicity, a case in which the IRD assumes a standard value IRD2.

Figure 24:
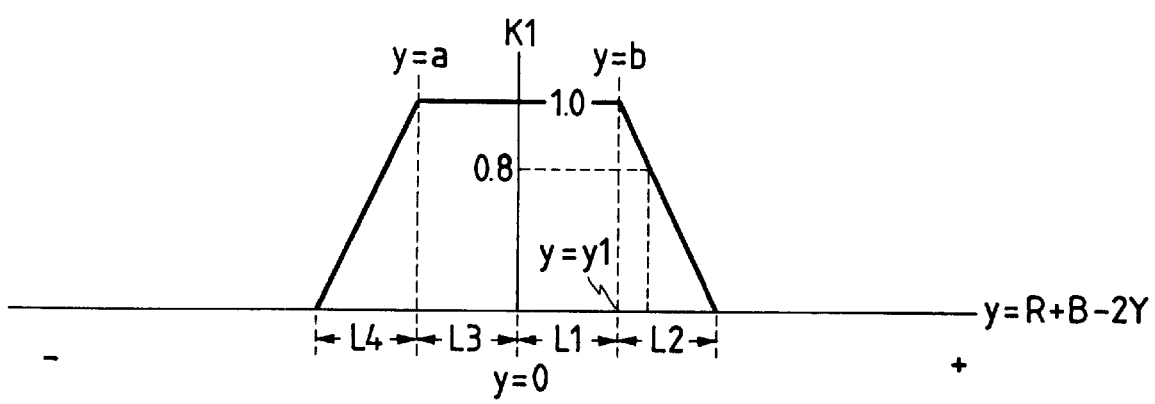
FIGS. 24, 25 and 26 are charts showing the function of determining the weighting coefficient in the image pickup apparatus shown in FIG. 22.

In the present embodiment, said coefficient K is given by K=K1×K2×K3, wherein the coefficient K1 is determined, according to the above-mentioned y-component as shown in FIG. 24, as K1=1.0 in a range −L3≦y≦+L1, and monotonously decreases within a range from 1.0 to 0.0 within ranges of y of −L3≦y≦−(L3+L4) or L1≦y≦(L1+L2). Stated differently, the coefficient K1 indicates the level of whiteness of the object as a function of the y component, the whiteness level being higher as the coefficient K1 becomes closer to unity.

Figure 25:
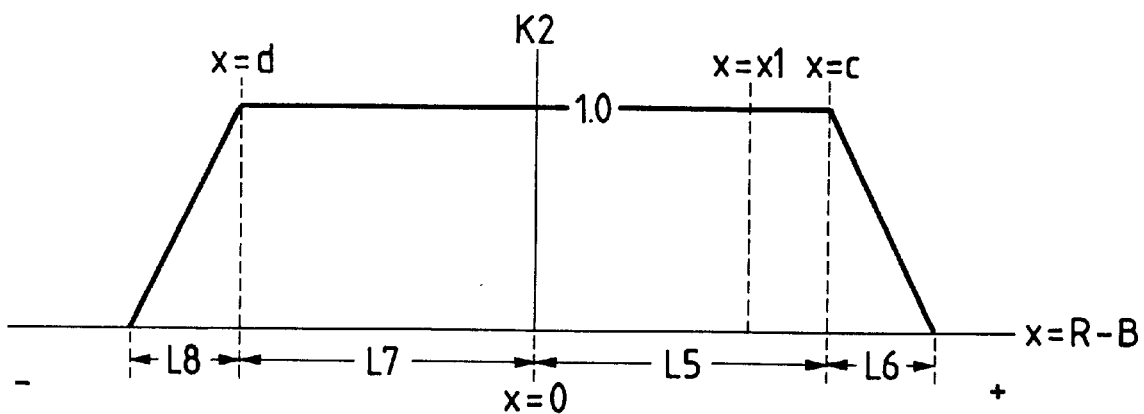

Similarly the coefficient K2 is given as a function of the x-component as shown in FIG. 25. If the x-component is very large or very small, it can be considered to be derived from the color of the object itself, so that the object can be considered not white. Consequently the coefficient K2 is defined as 1.0 within a range −L7≦x≦L5, but monotonously decreases within a range from 1.0 to 0.0 within ranges of x of −L7≦x≦−(L7+L8) or L5≦x≦(L5+L6).

Figure 26:
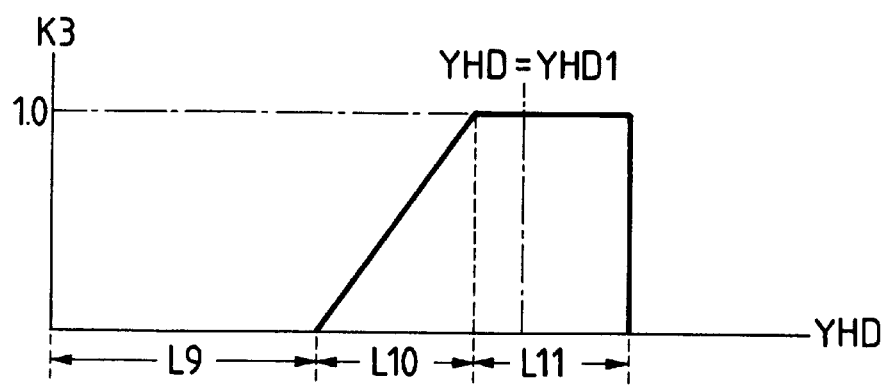

The coefficient K3 is defined as 1.0 if the level of the YHD signal is higher than (L9+L10) as shown in FIG. 26, as the probability of object color being white is high. As the YHD signal becomes lower than (L9+L10), the coefficient K3 is monotonously decreased from 1.0 to 0.0 until the YHD signal reaches a level L9, since the probability of object being white becomes lower. The coefficient K3 is defined as 3.0 when the YHD signal is at or lower than L9. However, if the YHD is larger than (L9+L10+L11), it is regarded as an abnormal signal, so that coefficient K3 is defined as 0.0.

In this manner the coefficient K is calculated from the coefficients K1, K2 and K3, and utilized for weighting the RYD, BYD signals supplied from the A/D converters 51, 52. The weighted signals RYD', BYD' are given by:

$$RYD'=K\times RYD=K1\times K2\times K3\times RYD$$

$$BYD'=K\times BYD=K1\times K2\times K3\times BYD$$

In such weighting calculation, the RYD' and BYD' become smaller than the original RYD, BYD as the absolute values of the x and y components become larger, and become closer to the original RYD, BYD as the YHD component becomes larger.

The weighting calculation unit 64 effects such weighting on all the RYD and BYD signals on the entire image frame, and sends the weighted data RYD', BYD' to the succeeding correction signal calculation unit 65.

The correction signal calculation unit 65 averages the RYD', BYD' over the entire image frame, then compares the obtained average values AVR (RYD'), AVR(BYD') with reference values RER, REB corresponding to a white balanced video signal, and calculates the correction signals $R_{cont}$, $B_{cont}$ for bringing said average values to said reference values, for supply to the D/A converters 56, 57.

A swill be apparent from the foregoing explanation, the RYD', BYD' in which any of the coefficients K1, K2, K3 is 0 are not used in the calculation of the correction signals. This is because the influence of data of the white object portion will be diluted in the white balance determination, if an object portion identified as not white is included in the average calculation over the entire image frame.

Therefore, in case the A/D conversion is conducted by dividing the entire image frame into N portions to obtain N sets of RYD', BYD', including M sets of RYD'=BYD'=0 because of K=0.0, the above-mentioned averages AVR (RYD'), AVR(BYD') are calculated as follows:

$$AVR(RYD')=(RYD'_1+RYD'_2+RYD'_3+\ldots+RYD'_{N-1}+RYD'_N)/(N-M)$$

$$AVR(BYD')=(BYD'_1+BYD'_2+BYD'_3+\ldots+BYD'_{N-1}+BYD'_N)/(N-M)$$

In the following there will be explained the advantage of calculating the white balance correction singals $R_{cont}$, $B_{cont}$ for controlling the gain control circuits 3, 4 according to the above-explained configuration.

Figure 27:
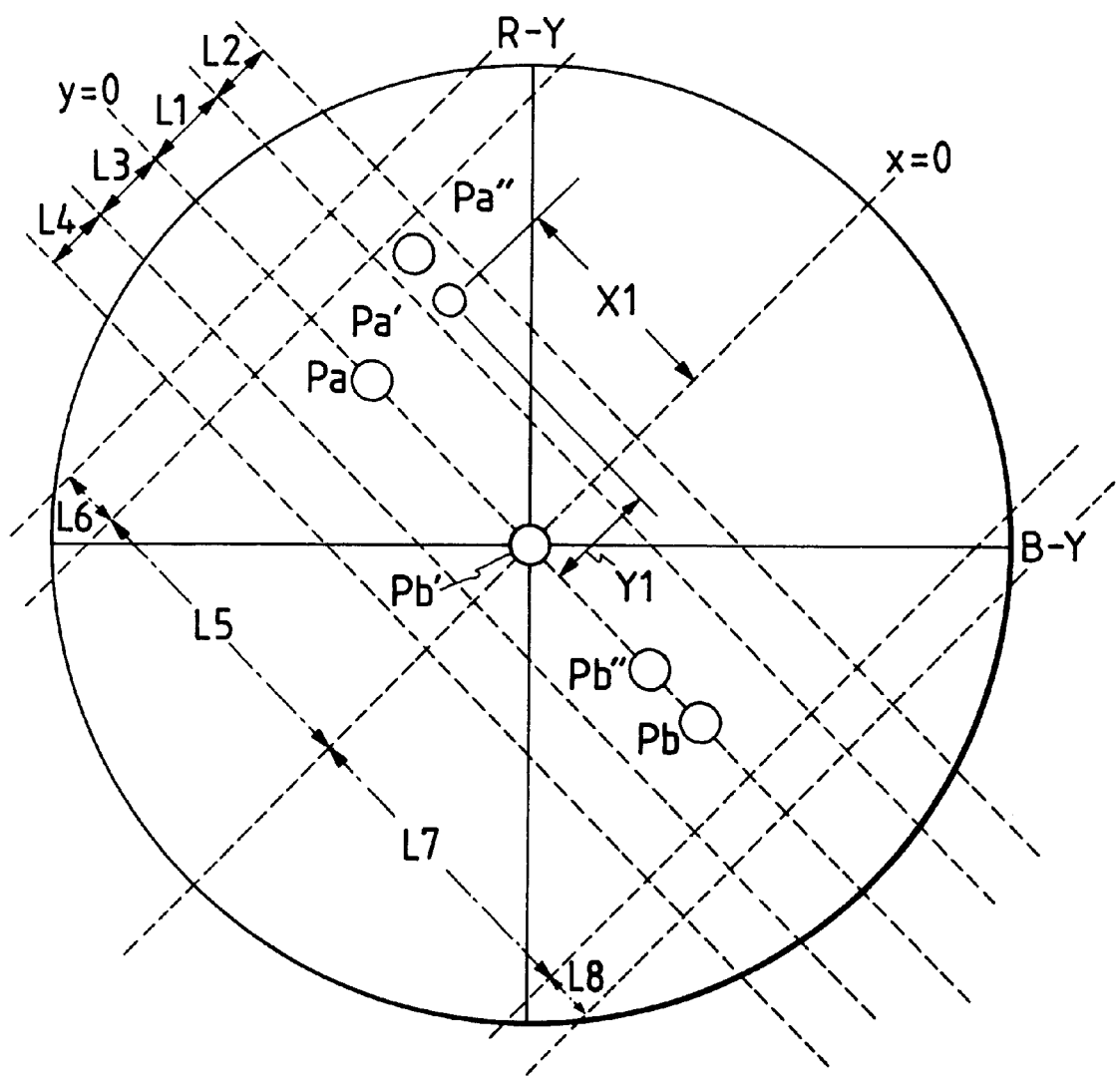
FIG. 27 is a view showing the effect resulting from the determination of the weighting coefficient in the image pickup apparatus shown in FIG. 22.

Let us consider a case in which, by taking an object consisting of orange color by 50% and blue color by 50%, there are obtained color difference vectors Pa, Pb in white balanced state, as shown in FIG. 27. However, each color difference vector is variable according a slight change in the object as explained before, and it is assumed that the color difference vector for orange color has varied from Pa to Pa'.

In such case, the conventional image pickup apparatus shown in FIG. 9 does not extract the signal corresponding to the color difference vector at Pa, but only extracts the blue signal corresponding to the vector at Pb and effects the white balance correction in such a manner that said vector for blue signal moves to a point Pb'. For this reason, satisfactory white balance cannot be attained. On the other hand, in the image pickup apparatus shown in FIG. 22, the signal corresponding to a color difference vector at Pa' is not completely excluded but the weighting coefficient K is slightly reduced from 1.0 depending on the whiteness level.

For example, if the x and y components of said point Pa' are respectively x1, y1 shown in FIGS. 25 and 24 and the YHD signal is at YHD1 in FIG. 26, the coefficients K1, K2 and K3 are respectively 0.8, 1.0 and 1.0 so that the coefficient K is equal to 0.8. Therefore the RYD, BYD signals corresponding to the color difference vector at Pa' is multiplied by 0.8. Thus the white balance is not significantly aberrated, and the orange and blue color difference vectors are stabilized respectively at Pa" and Pb".

As explained in the foregoing, the image pickup apparatus of the present embodiment enables white balance correction without error even if hue varies for example by image framing at the phototaking operation, fluctuations among the cameras or movement of the object.

In the following there will be explained the utilization of output of the iris position detector 40 in the present embodiment, for variably setting the relationship among the weighting coefficient K and the y and x components according to IRD.

As explained in the foregoing, the aberration or instability of the white balance resulting from a slight change in hue can be alleviated by continuously varying the coefficients K1–K3 according to the x and y components and the YHD signal. The above-mentioned variable setting of the relation among the weighting coefficient K and the y and x components prevents an error in the white balance correction, such as fading of a particular color, on objects of colors present in the vicinity of the trajectory of color temperature variation.

In general, if the color temperature is high, the light source is often outdoor daytime solar light, with a high luminance. On the other hand, if the color temperature is low, the light source is often an indoor incandescent lamp or the solar light at sunset, with a low luminance. Utilizing these faces, the weighting calculation unit 64 of the present embodiment variably selects the area in which the object is identified as white, namely the relationship among the weighting coefficient K and the y and x components, according to the data IRD digitized from the output of the iris position detector 40.

This variable setting operation will be explained in more details, with reference to FIGS. 28 to 32. The object is identified as white within an area of the y and x components defined by $-L3 \leq y \leq +L1$ and $-L7 \leq x \leq +L5$, and the parameters L1, L3, L5, L7 are variably set according to IRD.

Figure 28:
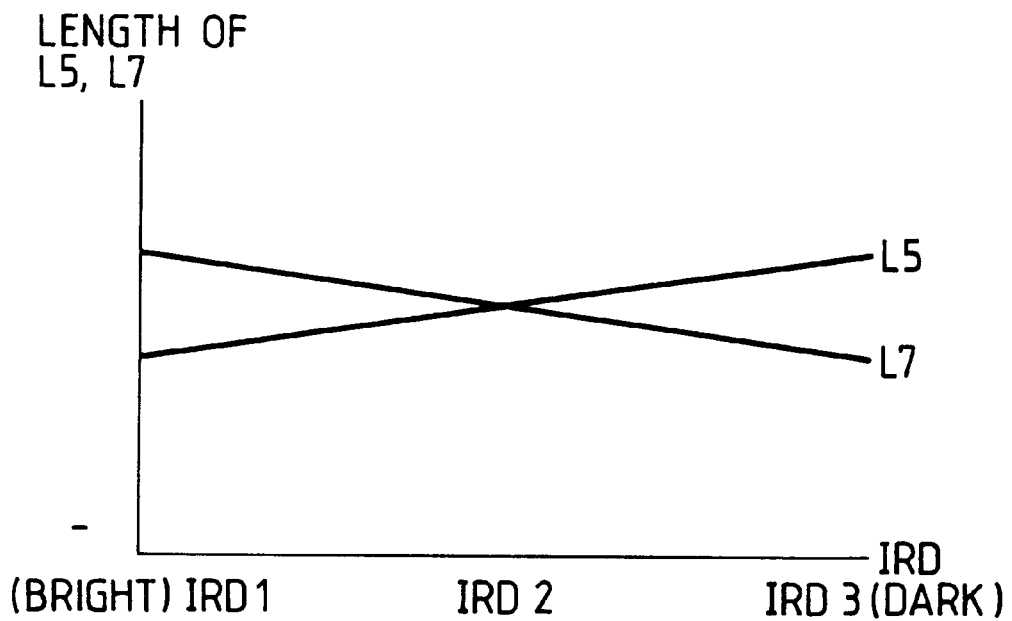
FIG. 28 is a chart showing the determination of a determining factor of the white discrimination area in the image pickup apparatus shown in FIG. 22.

FIG. 28 shows the relation among IRD, L5 and L7. When IRD becomes larger, namely when the iris 22 approaches the open state, L5 is increased while L7 is decreased.

Figure 29:
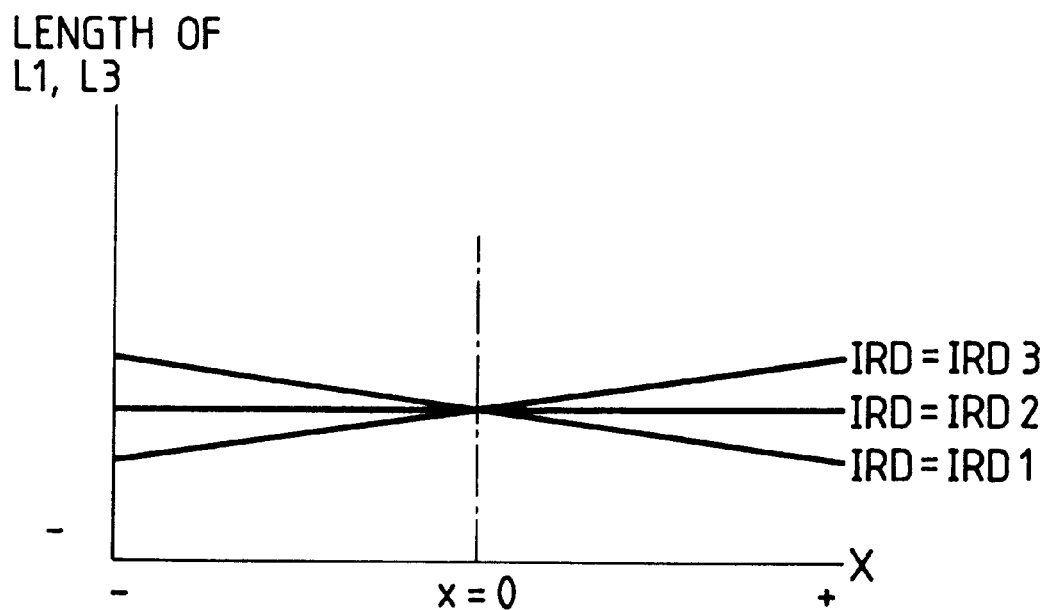
FIG. 29 is a chart showing the setting of another determining factor of the white discrimination area in the image pickup apparatus shown in FIG. 22.

The relation among IRD, L1 and L3 is shown in FIG. 29, in which the abscissa indicates the x component while the ordinate indicates the lengths of L1, L3. As IRD increases, L1 and L3 become smaller in the negative region of the x component and larger in the positive region.

FIGS. 30 to 32 show the change of the area in which the object is identified as white, respectively at a large IRD value (IRD3), a standard IRD value (IRD2) and a small IRD value (IRD1). In fact said area varies continuously from the state shown in FIG. 30 to that in FIG. 32, according to the IRD value.

As will be apparent from FIGS. 28 to 32, in a low luminance situation, the apparatus of the present embodiment increases L5 and also increases L1 and L3 in the positive region of the x-component, thereby fetching a larger proportion of the signals with orange or red color difference vectors into said area of identifying the white object, thus preventing the fading of blue objects.

On the other hand, in a high luminance situation, where IRD becomes smaller, the present embodiment reduced L5 and increases L1 and L3 in the negative region of the x component, thereby fetching a larger proportion of the signals with blue color difference vectors into said area, thus preventing the fading of orange or red objects.

Also since said area in which the object is identified as white is variably set according to the luminance of the object, said area varies in the course of a phototaking operation, following the change in the color temperature in said operation. It is therefore rendered possible to prevent a phenomenon that the color difference vector of a same object fluctuates between inside and outside said area, and the control operation for white balance can therefore be stabilized.

As explained in the foregoing, the image pickup apparatus of the present embodiment can achieve stable white balance correction without error, even in the presence of a slight change in the hue of the object at the phototaking operation, by multiplying the RYD, BYD signals with a continuously variable coefficient K. Also the variable setting of the area, in which the object is identified as white, according to the luminance of the object enables white balance correction which is faithful of the original colors of the objects without color fading phenomenon, and which is stable regardless of the eventual change in the color temperature in the course of the phototaking operation.

In the present embodiment, the signals RYD, BYD are multiplied by the continuously variable coefficient K, but stable white balance correction without error can be attained by giving at least three different values to said coefficient K.

Also in the present embodiment, the data RYD, BYD indicating the values of the color difference singals R-Y and B-Y are directly multiplied by the coefficient K, but it is also possible to obtain a similar effect in a configuration in which other color information representing other plural color signals, such as x component (=R-B) are multiplied by the coefficient K and the white balance correction is achieved by said multiplied color information, by assigning at least three different values to said coefficient K.

Furthermore, the present embodiment variably sets the value of the coefficient K according to the values of the x and y components, but the value of said coefficient K may be variably set according to data corresponding to plural color signals such as RYD and BYD.

Furthermore, the present embodiment variably sets the area, in which the object is identified as white, according to the iris position, but the variable setting of said area may also be achieved according to the YL signal, or another signal indicating the luminance, such as the output of an external light metering circuit.

As explained in the foregoing, the fourth embodiment of the image pickup apparatus of the present invention is capable of preventing a large fluctuation in the white balance correction resulting from a change in the hue of the object, thereby achieving stable white balance correction with little visual error, by weighting the color information, employed in the white balance control, with at least three different coefficients determined by the values of plural color signals.

Also the relationship between the weighting coefficients, defined for the color information employed in the white balance control, and the plural color signals is rendered continuously variable according to the luminance of the object. Consequently the white balance correction is not affected by a slight change in the color temperature of the light source illuminating the object, but can be attained stably with little error such as the fading of particular colors.

What is claimed is:

1. An image pickup apparatus, comprising:
   a) image pickup means for forming, from the light coming from an object, a video signal including plural color signals;
   b) gain control means for receiving a gain control signal and controlling the gain of said plural color signals according to said gain control signal; and
   c) calculation means for forming said gain control signal according to plural color information relative to said plural color signals;
      wherein said calculation means includes weighting means for weighting said plural color information with a coefficient whose value is determined from at least three values determined according to the values of said plural color signals respectively, and is adapted to calculate said gain control signal according to said plural color information weighted by said weighting means.

2. An apparatus according to claim 1, wherein said weighting means is adapted to continuously vary said coefficient according to the values of said plural color signals.

3. An apparatus according to claim 1, wherein said video signal further includes a luminance signal, and said weighting means is adpated to vary said weighting according to the value of said luminance signal.

4. An apparatus according to claim 1, further comprising:
   luminance detection means for generating luminance information relative to the luminance of said object;
   wherein said weighting means includes varying means for varying the relation between the values of said plural color signals and said coefficient, according to said luminance information.

5. An apparatus according to claim 4, wherein said varying means is adapted to continuously vary the relation between the values of said plural color signals and said coefficient, according to said luminance information.

6. An apparatus according to claim 4, further comprising:
   an iris for limiting the light coming from the object and entering said image pickup means;
   wherein said luminance detection means is adapted to generate said luminance information by detecting the state of said iris.

7. An image pickup apparatus comprising:
   a) image pickup means for forming, from the light coming from an object, a video signal including plural color signals;
   b) gain control means for receiving a gain control signal and controlling the gain of said plural color signals according to said gain control signal; and
   c) calculation means for forming said gain control signal according to plural color information relative to said plural color signals;
      wherein said calculation means includes weighting said plural color information according to the result of multiplication of plural coefficients which are respectively determined according to mutually different plural hue components of said video signal, and is adapted to calculate said gain control signal according to said plural color information weighted by said weighting means.

8. An apparatus according to claim 7, wherein said weighting means is adapted to continuously vary said plural coefficients according to said plural hue components.

9. An apparatus according to claim 7, wherein said video signal further includes a luminance signal, and said weighting means is adapted to vary said weighting according to the result of multiplication of all of a coefficient determined according to the value of said luminance signal and plural coefficients determined according to said plural hue components.

10. An apparatus according to claim 7, further comprising:
    luminance detection means for generating luminance information relative to the luminance of said object;
    wherein said weighting means includes varying means for varying the relation between said plural hue components and said coefficient according to said luminance information.

11. An image pickup apparatus, comprising:
    a) image pickup means for forming, from the light coming from an object, a video signal including plural color signals;
    b) iris detection means for generating iris information;
    c) gain control means for receiving a gain control signal and controlling the gain of said plural color signals according to said gain control signal; and
    d) calculation means for forming said gain control signal according to plural color information relative to said plural color signals;
    wherein said calculation means includes weighting means for weighting said plural color information with a coefficient determined according to the values of said plural color signals, and is adapted to calculate said gain control signal according to said plural color information weighted by said weighting means; and
    wherein said weighting means includes varying means for varying the relation between said plural color signals and said coefficient, according to said iris information.

12. An apparatus according to claim 11, wherein said varying means is adapted to cotinuously vary the relation between said plural color signals according to said iris information.

13. An apparatus according to claim 11, further comprising:

an iris for limiting the light coming from said object and entering said image pickup means;

wherein said iris detection means is adapted to generate said iris information by detecting the state of said iris.

* * * * *

UNITED STATES PATENT AND TRADEMARK OFFICE
CERTIFICATE OF CORRECTION

PATENT NO. : 6,108,037
DATED : August 22, 2000
INVENTOR(S) : Hirofumi Takei

It is certified that error appears in the above-identified patent and that said Letters Patent is hereby corrected as shown below:

Column 3,
Line 12, "$W_0W_0$ and $B_0B_2$)" should read -- $W_0W_2$ and $B_0B_2$) --

Column 4,
Line 12, "$W_0$, $Y_0$" should read -- $W_0$, $Ye_0$ --
Line 20, "a image" should read -- another prior art image --

Column 5,
Line 29, "$a \geq y$ or $a \leq y$." should read -- $a \geq y$ or $a < y$. --
Line 31, "$y \geq b$ or $y \leq b$." should read -- $y \geq b$ or $y < b$. --

Column 10,
Line 66, "$V_{2r}$ and $B_{cont}=V_{2b}$," should read -- $V_{2r}'$ and $B_{cont}=V_{2b}'$ --

Column 11,
Lines 30-31, "$V_{3r}'$ and $B_{cont}=V_{3b}$" should read -- $V_{3r}'$ and $B_{cont}=V_{3b}'$, --

Column 12,
Line 31, "$V_{2r}$, $V_{2b}$" should read -- $V_{2r}'$, $V_{2b}'$ --
Line 32, "$V_{2r}$." should read -- $V_{2r}'$. --
Line 35, "($R_{cont}+K=V_{2r}$, where $K=0$)." should read -- ($R_{cont}+K=V_{2r}'$, where $K=0$). --
Line 64, "$V_{2r}$," should read -- $V_{2r}'$ --

Column 13,
Line 27, delete "ps" and begin "4th Embodiment" on a new line

Signed and Sealed this

Seventh Day of May, 2002

*Attest:*

*Attesting Officer*

JAMES E. ROGAN
*Director of the United States Patent and Trademark Office*